United States Patent
Watanabe et al.

(10) Patent No.: US 7,100,074 B2
(45) Date of Patent: Aug. 29, 2006

(54) STORAGE SYSTEM, AND CONTROL METHOD, JOB SCHEDULING PROCESSING METHOD, AND FAILURE HANDLING METHOD THEREFOR, AND PROGRAM FOR EACH METHOD

(75) Inventors: Yasuo Watanabe, Kawasaki (JP); Yasutomo Yamamoto, Sagamihara (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 384 days.

(21) Appl. No.: 10/771,453

(22) Filed: Feb. 5, 2004

(65) Prior Publication Data

US 2005/0132256 A1    Jun. 16, 2005

(30) Foreign Application Priority Data

Nov. 20, 2003    (JP) .............................. 2003-390239

(51) Int. Cl.
    *G06F 11/00* (2006.01)
(52) U.S. Cl. .................. 714/9; 714/5; 714/22
(58) Field of Classification Search .................... 714/9
    See application file for complete search history.

(56) References Cited

U.S. PATENT DOCUMENTS

| | | | | |
|---|---|---|---|---|
| 5,148,432 A | * | 9/1992 | Gordon et al. .................. | 714/7 |
| 5,166,939 A | * | 11/1992 | Jaffe et al. .................... | 714/766 |
| 5,341,493 A | * | 8/1994 | Yanai et al. ................... | 711/161 |
| 5,448,719 A | | 9/1995 | Schultz et al. | |
| 5,568,629 A | * | 10/1996 | Gentry et al. ................. | 711/114 |
| 5,657,468 A | * | 8/1997 | Stallmo et al. ............... | 711/114 |
| 5,819,054 A | | 10/1998 | Ninomiya et al. | |
| 5,854,942 A | * | 12/1998 | Penokie ........................ | 710/10 |
| 6,487,634 B1 | * | 11/2002 | Bachmat ...................... | 711/112 |
| 6,567,892 B1 | * | 5/2003 | Horst et al. .................. | 711/114 |
| 6,571,354 B1 | * | 5/2003 | Parks et al. .................... | 714/7 |
| 6,611,903 B1 | | 8/2003 | Fujimoto et al. | |
| 6,618,798 B1 | * | 9/2003 | Burton et al. ............... | 711/202 |
| 6,658,434 B1 | | 12/2003 | Watanabe et al. | |
| 6,687,787 B1 | * | 2/2004 | Richardson et al. ........ | 711/114 |
| 6,857,059 B1 | * | 2/2005 | Karpoff et al. ............. | 711/209 |
| 6,886,054 B1 | | 4/2005 | Taninaka et al. | |
| 2004/0078508 A1 | * | 4/2004 | Rivard .......................... | 711/4 |
| 2005/0005034 A1 | | 1/2005 | Johnson | |

FOREIGN PATENT DOCUMENTS

| | | |
|---|---|---|
| JP | 11-167521 | 6/1999 |
| JP | 2001-175423 | 6/2001 |
| JP | 2002-334049 | 11/2002 |
| JP | 2003-6016 | 1/2003 |

* cited by examiner

*Primary Examiner*—Robert Beausoliel
*Assistant Examiner*—Gabriel L. Chu
(74) *Attorney, Agent, or Firm*—Mattingly, Stanger, Malur & Brundidge, P.C.

(57) ABSTRACT

An arbitrary number of a plurality of physical devices are mapped to each logical device provided for a host as a working unit, while considering a priority given to each logical device, and with each physical device being made up of a plurality of disk devices. This arrangement allows dirty data to be quickly saved to the disk devices in the order of logical device priority in the event of a failure. Furthermore, jobs are preferentially processed for important tasks in the event of a failure to reduce deterioration of the host processing performance.

11 Claims, 17 Drawing Sheets

FIG. 3

| 201 | LOGICAL DEVICE NUMBER | 1 | 2 | 3 | 4 | 5 | 6 | 7 | ... |
|---|---|---|---|---|---|---|---|---|---|
| 202 | SIZE | 1GB | 2GB | 3GB | 4GB | 4GB | 4GB | 4GB | ... |
| 203 | DEVICE STATE | ONLINE | ONLINE | ONLINE | OFFLINE | ONLINE | ONLINE | ONLINE | ... |
| 204 | PHYSICAL DEVICE NUMBER | 1 | 2 | 3 | 4 | 5 | 6 | 7 | ... |
| 205 | ACCESS-GRANTED HOST NUMBER | 1 | 2 | 3 | UNDEFINED | 4 | UNDEFINED | UNDEFINED | ... |
| 206 | PORT NUMBER/ TARGET ID/LUN | 1/0/0 | 2/0/0 | 3/0/0 | UNDEFINED | 4/0/0 | UNDEFINED | UNDEFINED | ... |
| 207 | LOGICAL DEVICE PRIORITY | 1 | 5 | 3 | 3 | 1 | 3 | 3 | ... |
| 208 | EXTENDED LOGICAL DEVICE INFORMATION | UNDEFINED | UNDEFINED | UNDEFINED | UNDEFINED | 5,6,7 | UNDEFINED | UNDEFINED | ... |
| 209 | DATA SAVE INFORMATION IN FAILURE EVENT | UNDEFINED | UNDEFINED | UNDEFINED | UNDEFINED | UNDEFINED | UNDEFINED | UNDEFINED | ... |

FIG. 4

| PORT NUMBER (301) | TARGET ID/LUN (302) | ACCESS-GRANTED HOST NUMBER (303) | ASSOCIATED LOGICAL DEVICE NUMBER (304) |
|---|---|---|---|
| 1 | 0/0 | 1 | 1 |
| 2 | 0/0 | 2 | 2 |
| ... | ... | ... | ... |

FIG. 5

| 401 | PHYSICAL DEVICE NUMBER | 1 | 2 | 3 |
|---|---|---|---|---|
| 402 | SIZE | 72GB | 72GB | 72GB |
| 403 | CORRESPONDING LOGICAL DEVICE NUMBER LIST | 1, 2, 3, 4 | 5, 6, 7, 8 | 9, 10, 11, 12 |
| 404 | DEVICE STATE | ONLINE | ONLINE | ONLINE |
| 405 | RAID CONFIGURATION | RAID5, 3D+1P | RAID5, 3D+1P | RAID1, 2D+2P |
| 406 | DISK NUMBER LIST | 1, 2, 3, 4 | 5, 6, 7, 8 | 9, 10, 11, 12 |
| 407 | STRIPE SIZE | 48KB | 48KB | 48KB |
| 408 | SIZE WITHIN DISK | 18GB | 18GB | 18GB |
| 409 | STARTING OFFSET WITHIN DISK | 0 | 0 | 0 |

FIG. 6

| SLOT NUMBER (501) | SEGMENT NUMBER LIST (502) | SLOT ATTRIBUTE (503) | LOGICAL DEVICE NUMBER (504) | HOST NUMBER (505) | LOCK INFORMATION (506) |
|---|---|---|---|---|---|
| 1 | 1, 2, 3 | CLEAN | 1 | 1 | ON |
| 2 | 4, 0, 6 | DIRTY | 2 | 2 | OFF |
| 3 | 7, 8, 9 | DIRTY | 3 | 3 | OFF |
| 4 | 0, 0, 0 | FREE | 4 | 4 | OFF |
| .. | .. | .. | .. | .. | .. |

FIG. 7

| SEGMENT NUMBER | BLOCK INFORMATION | | | |
|---|---|---|---|---|
| | 1 | 2 | 3 | 4 |
| 1 | VALID | INVALID | VALID | INVALID |
| 2 | INVALID | INVALID | VALID | VALID |
| 3 | VALID | VALID | INVALID | INVALID |
| .. | .. | .. | .. | .. |

601 — SEGMENT NUMBER
602 — BLOCK INFORMATION

FIG. 8

| | | | |
|---|---|---|---|
| JOB NUMBER | 1 | 2 | 3 |
| PROCESSING TYPE | READ | READ | WRITE |
| LOGICAL DEVICE NUMBER | 1 | 2 | 3 |
| TRANSFER START POSITION | 0 | 512 | 1024 |
| TRANSFER LENGTH | 512B | 512B | 512B |
| HOST NUMBER | 1 | 2 | 3 |

701 — JOB NUMBER
702 — PROCESSING TYPE
703 — LOGICAL DEVICE NUMBER
704 — TRANSFER START POSITION
705 — TRANSFER LENGTH
706 — HOST NUMBER

FIG. 9

| 801 | JOB NUMBER | 1 | 2 | 3 | ... |
|---|---|---|---|---|---|
| 802 | PROCESSING TYPE | READ | READ | WRITE | ... |
| 803 | LOGICAL DEVICE NUMBER | 1 | 2 | 3 | ... |
| 804 | TRANSFER START POSITION | 0 | 512 | 1024 | ... |
| 805 | TRANSFER LENGTH | 512B | 512B | 512B | ... |
| 806 | HOST NUMBER | 1 | 2 | 3 | ... |
| 807 | CHANNEL JOB NUMBER | 1 | 2 | 3 | ... |

| HOST NUMBER | HOST NAME/WWN | HOST PRIORITY |
|---|---|---|
| 1 | hosta/WWNa | 1 |
| 2 | hostb/WWNb | 2 |
| 3 | hostc/WWNc | 3 |
| ... | ... | ... |

| | | | |
|---|---|---|---|
| 1001 | LOGICAL DEVICE NUMBER | 1 | 2 | 3 |
| 1002 | READ COUNT | 20 | 40 | 60 |
| 1003 | WRITE COUNT | 30 | 50 | 70 |
| 1004 | READ HIT COUNT | 5 | 15 | 25 |
| 1005 | WRITE HIT COUNT | 10 | 20 | 30 |
| 1006 | SEQUENTIAL READ COUNT | 1 | 3 | 5 |
| 1007 | SEQUENTIAL WRITE COUNT | 2 | 4 | 6 |
| 1008 | DIRTY DATA AMOUNT MANAGEMENT INFORMATION | 0.1GB,·· | 0.1GB,·· | 0.1GB,·· |

FIG. 12

| TASK NUMBER (1101) | LOGICAL DEVICE NUMBER (1102) | HOST NUMBER (1103) | TASK PRIORITY (1104) |
|---|---|---|---|
| 1 | 0 | 0 | 1 |
| 2 | 0 | 1 | 2 |
| 3 | 1 | 0 | 3 |
| ·· | ·· | ·· | ·· |

FIG. 13

| LOGICAL DEVICE PRIORITY MEASURE (1201) | HOST PRIORITY MEASURE (1202) | TASK PRIORITY MEASURE (1203) |
|---|---|---|
| 0.5 | 0.3 | 0.2 |

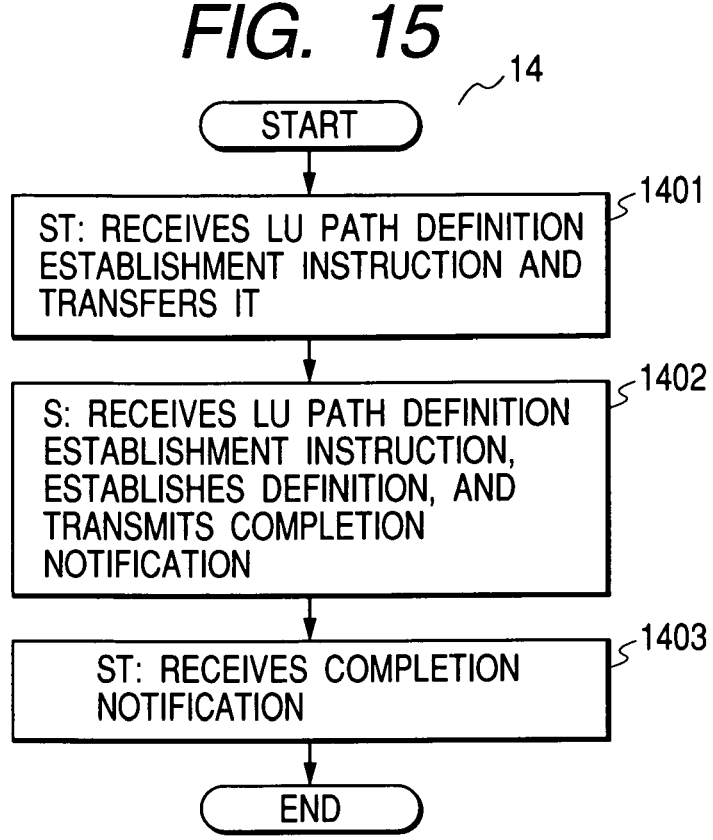
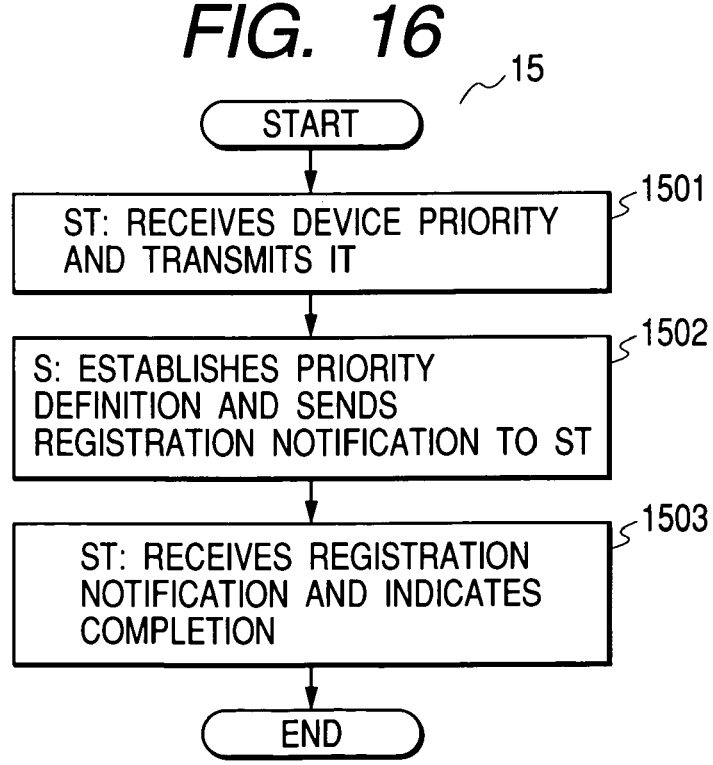

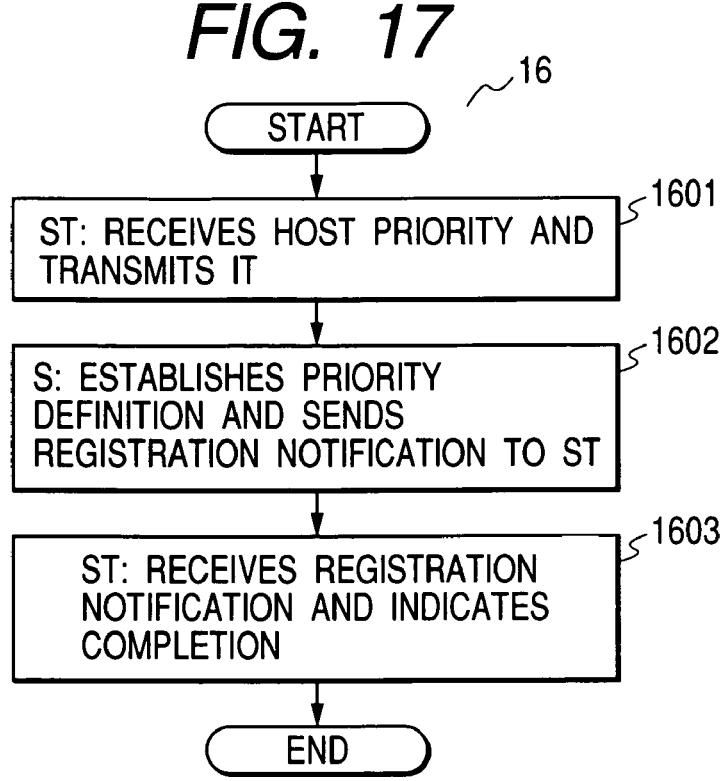
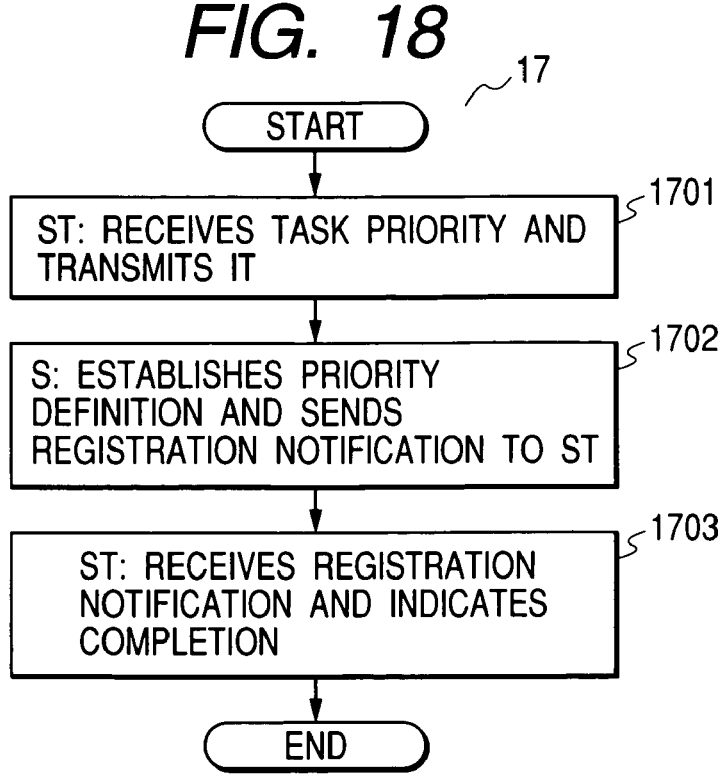

STORAGE SYSTEM, AND CONTROL METHOD, JOB SCHEDULING PROCESSING METHOD, AND FAILURE HANDLING METHOD THEREFOR, AND PROGRAM FOR EACH METHOD

BACKGROUND OF THE INVENTION

The present invention relates to a storage system.

One known prior art technique (hereinafter referred to as prior art technique 1) described in Japanese Patent Laid-Open No. 11-167521 (1999) employs a common bus system so that logical modules, such as host adapters and storage adapters, as well as cache memories and disk devices can be added to the system according to the system configuration (scale), creating a scalable storage system. In this storage system, each logical module, disk device, and common bus are multiplexed, enabling an operation in a degraded mode, "hot-plugging" of the logical modules and storage media, and hence maintenance of the system without a system shutdown.

Many of the disk control devices disposed between hosts and disk devices for controlling data transfer therebetween, such as those employed by the above prior art technique 1, each include a cache memory for temporarily storing data to be transferred. However, since this cache memory is a volatile memory, the data in it disappears when the power supply is stopped. Furthermore, the data may be lost due to a failure in the cache memory hardware in the disk control device. To prevent such data loss, a known disk control device includes duplexed cache memories and stores write data in them. Even with such a configuration, however, data will be lost in the event of a double cache failure.

The above prior art technique 1 also employs a redundant power supply in addition to a primary power supply, and thereby the system can continue to operate even when one of them has failed. Furthermore, the standby power supply provided for the disk control devices allows prevention of data loss in the cache memories and the shared memories in the event of a power failure. Specifically, when a failure has occurred in the power supply, the dirty data in the cache memories is saved to the disk devices so that data in the cache memories is reflected in them.

If a write request is issued from a host after such a failure handling operation, a synchronous write operation is carried out in which a write completion notification is sent to the host after the write data has been written to a disk device, in order to ensure data integrity. The synchronous write operation, however, has the problem of exhibiting reduced response to the host, as compared with the "write-back" method.

Another known prior art technique (hereinafter referred to as prior art technique 2) is disclosed in Japanese Patent Laid-Open No. 2002-334049. Prior art technique 2 limits the quantity of side files input to the storage subsystem subordinate to a plurality of hosts which performs asynchronous remote copy operations. This limit operation is achieved by setting a priority for each host and thereby preventing data with a low importance level from occupying the greater part of the cache memories.

Still another known prior art technique (hereinafter referred to as prior art technique 3) is disclosed in Japanese Patent Laid-Open No. 2003-6016. In asynchronous remote copy operation, prior art technique 3 sets a copy priority for each logical volume group and performs copy operation on these logical volume groups in order of priority.

SUMMARY OF THE INVENTION

Even with the above prior art technique 1, the dirty data in the cache memories might be lost in the event of a failure, as described later. Prior art technique 1 employs a standby power supply to destage the dirty data in the cache memories when a power failure has occurred. Furthermore, in preparation for a cache memory failure, prior art technique 1 duplexes cache memories and shared memories which hold data for managing the cache memories.

However, when it has become unable to use the standby power supply due to continued power failure or when a double failure has occurred in the cache memories or shared memories, prior art technique 1 loses data which has not been saved to the disks, whether the data is important or not. Further, to ensure data integrity, prior art technique 1 performs synchronous write operation in the event of a failure, which reduces the total input/output processing performance of the storage.

Still further, the above prior art techniques 2 and 3 give no consideration to measures for handling a power failure or a failure in cache memory.

The present invention has been devised to solve the above problems. It is, therefore, an object of the present invention to provide a storage system capable of quickly saving data from cache memories to disk devices in the event of a failure and thereby preventing loss of important data with a high priority, as well as providing a control method, a job scheduling processing method, and a failure handling method for the storage system, and a program for each method.

A storage system of the present invention comprises: a port functioning as an interface to a host; a cache memory; a shared memory; a control device connected to the port, the cache memory, and the shared memory through a connection line; and a disk device connected to the control device; wherein the storage system performs the steps of: from a service terminal, receiving first priority information on each logical device provided for a host; mapping more physical devices to a logical device with a high priority than that with a low priority based on the first priority information; and in the event of a failure, performing control such that data held in the cache memory and belonging to a logical device is saved to a plurality physical devices mapped to the logical device.

The present invention can quickly destage dirty data in cache memories within a storage system to disk devices when a failure has occurred in the storage system, thereby preventing loss of important data with a high priority.

The present invention also can prevent performance reduction of important tasks with a high priority whenever possible in the event of a failure in the storage system.

BRIEF DESCRIPTION OF THE DRAWINGS

FIG. 3 is a diagram showing an illustrative configuration of a logical device management table according to the present invention.

FIG. 4 is a diagram showing an illustrative configuration of an LU path management table according to the present invention.

FIG. 5 is a diagram showing an illustrative configuration of a physical device management table according to the present invention.

FIG. 6 is a diagram showing an illustrative configuration of a slot management table according to the present invention.

FIG. 7 is a diagram showing an illustrative configuration of a segment management table according to the present invention.

FIG. 8 is a diagram showing an illustrative configuration of a channel job management table according to the present invention.

FIG. 9 is a diagram showing an illustrative configuration of a disk job management table according to the present invention.

FIG. 10 is a diagram showing an illustrative configuration of a host management table according to the present invention.

FIG. 11 is a diagram showing an illustrative configuration of an access pattern management table according to the present invention.

FIG. 12 is a diagram showing an illustrative configuration of a task management table according to the present invention.

FIG. 13 is a diagram showing an illustrative configuration of a scheduling management table according to the present invention.

FIG. 15 is a process flowchart showing an illustrative example of an LU path definition processing according to the present invention.

FIG. 16 is a process flowchart showing an illustrative example of logical device priority definition processing according to the present invention.

FIG. 17 is a process flowchart showing an illustrative example of host priority definition processing according to the present invention.

FIG. 18 is a process flowchart showing an illustrative example of task priority definition processing according to the present invention.

DETAILED DESCRIPTION OF THE PREFERRED EMBODIMENTS

Figure 1:
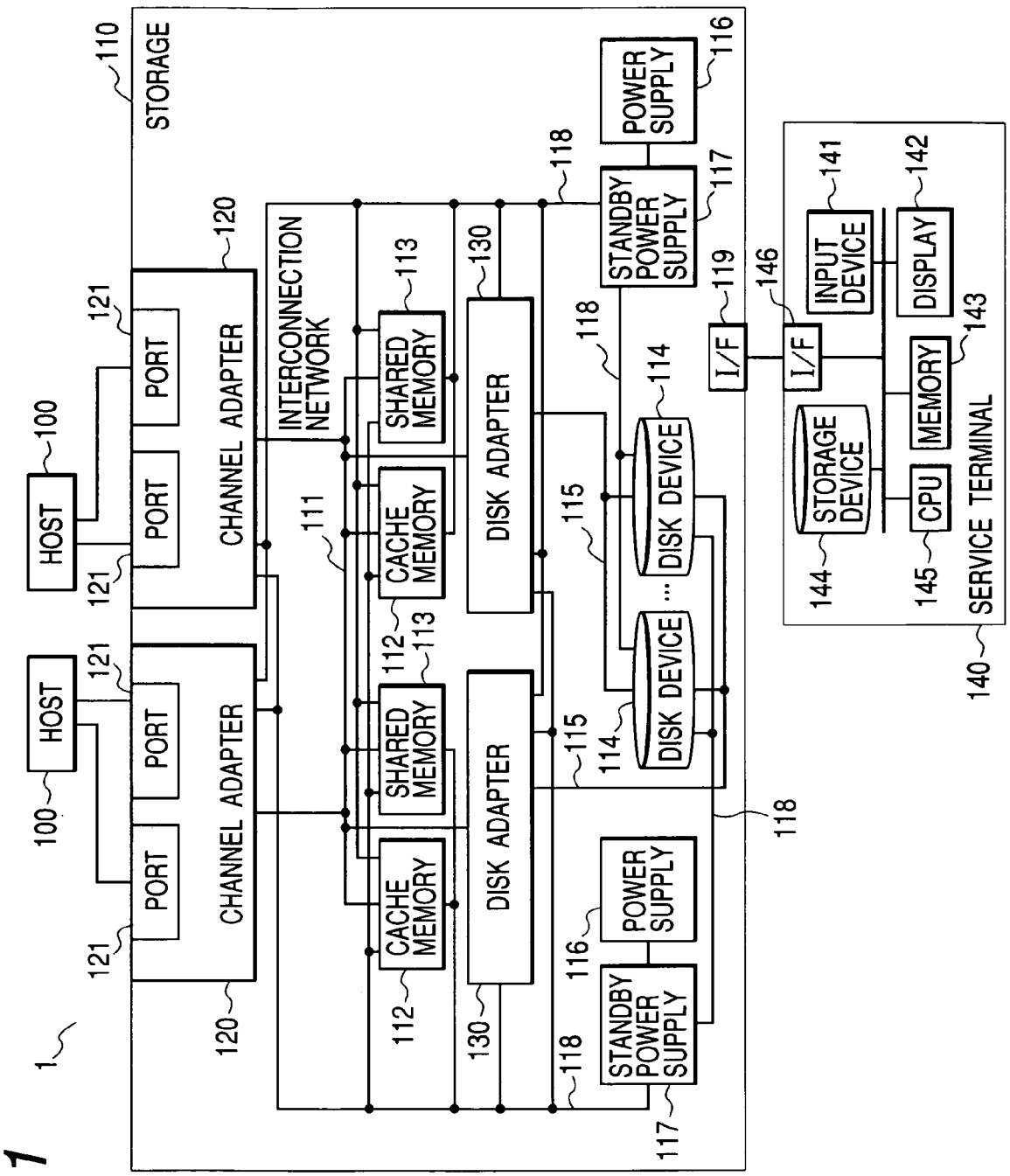
FIG. 1 is a diagram showing the configuration of a computer system including storage according to an embodiment of the present invention.

A preferred embodiment of the present invention will be described below with reference to the accompanying drawings.

The present embodiment of the invention aims to, when a failure has occurred in storage 110, quickly destage to disk devices 114 dirty data in cache memories 112 which has not yet been reflected in the disk devices 114. The present embodiment accomplishes this by optimizing, beforehand, the physical devices to which the logical devices are mapped. When a failure has occurred in the storage 110, the storage 110 destage the dirty data (belonging to the logical devices) to the disk devices 114 in priory order set for the logical devices through a service terminal 140 beforehand. The service terminal 140 is used and managed by the storage manager through an input device. In such a case (when a failure has occurred in the storage 110), the storage 110 also schedules jobs to be executed therein based on priority order set through the service terminal 140, beforehand, which is used and managed by the storage manager through the input device.

The present embodiment of the present invention will be described below with reference to FIGS. 1 to 26.

FIG. 1 illustrates a computer system (a storage system) 1 according to an embodiment of the present invention. The computer system 1 comprises hosts 100, storage 110, and a service terminal 140. Each host 100 issues an input/output request to the storage 110. Responsive to the input/output request from each host 100, the storage 110 reads from or write to a disk device 114 via a cache memory 112 included in the storage 110. The service terminal 140 receives input from the storage manager, and uses and manages the storage 110.

The configuration of the storage 110 will be described below. The storage 110 includes channel adapters 120, disk adapters 130, an interconnection network (made up of connection lines) 111, cache memories 112, shared memories 113, disk devices 114, connection lines 115, power supplies 116, standby power supplies (batteries) 117, and power lines 118. The disk adapters 130 are each connected to a respective disk device 114. Furthermore, they are connected to one another by way of the interconnection network 111 such that all disk devices 114 can be used even when one of the disk adapters 130 or the connection between a disk adapter 130 and a disk device 114 has failed.

Each channel adapter 120 controls data transfer between a host 100 and a cache memory 112. Each disk adapter 130 controls data transfer between a cache memory 112 and a disk device 114. A cache memory 112 is a memory for temporarily storing data received from a host 100 or data read from a disk device 114. To enhance the response to the hosts 100, a "write-back cache" method is generally used to handle a write request from each host 100. The "write-back cache" method issues a write completion notification to a host 100 at the time point at which data has been written into a cache memory 112. Shared memories 113 are shared by all channel adapters 120 and disk adapters 130.

In storage using disk devices 114, especially that controlling a disk array such as a RAID (Redundant Array of Independent Disks) device, data is stored on the disk devices 114, which are actually installed physical devices, according to the data format of the logical devices provided for the hosts 100.

Figure 2:
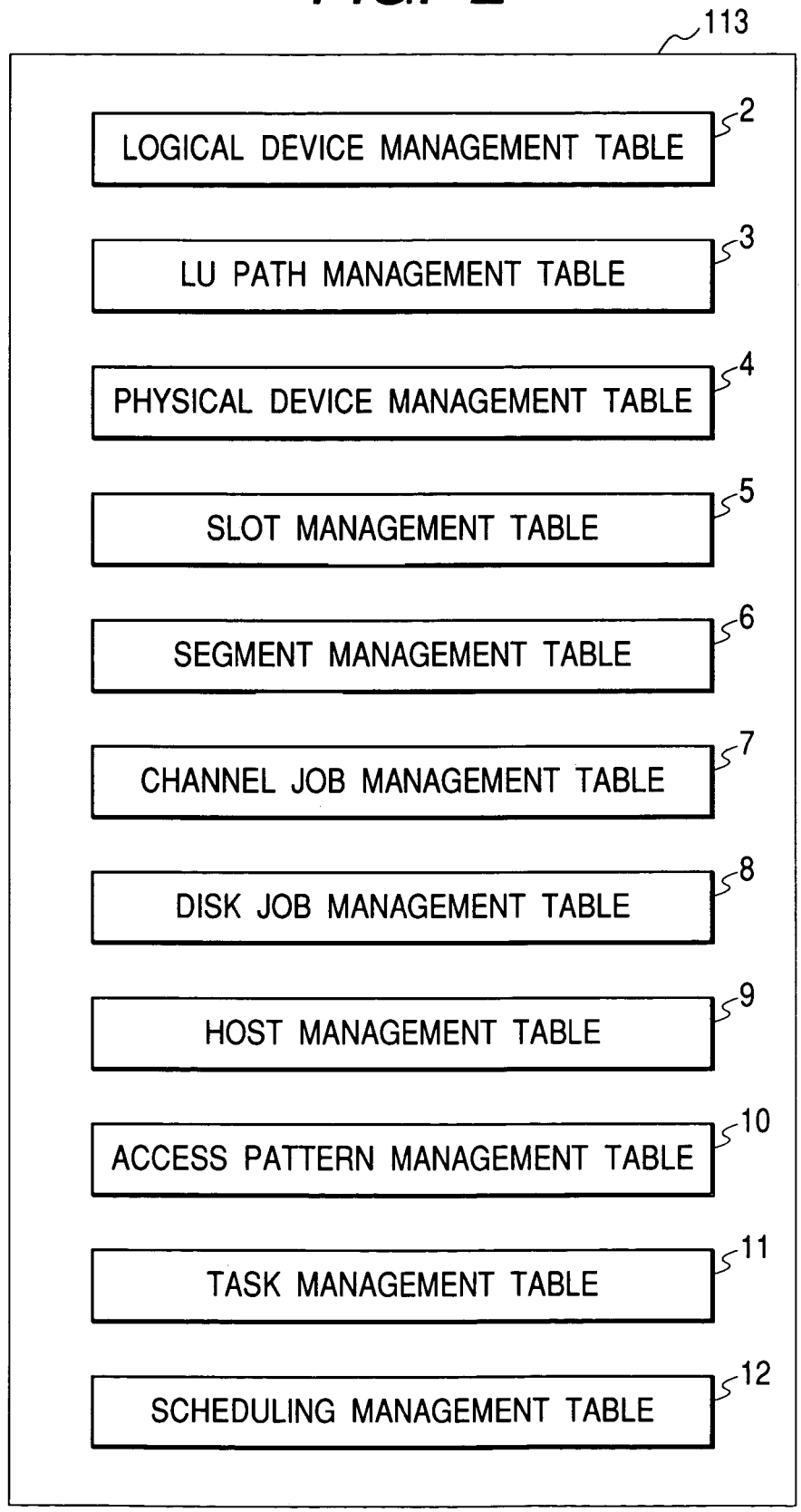
FIG. 2 is a diagram showing each type of management table stored in shared memories according to the present invention.
Figure 14:
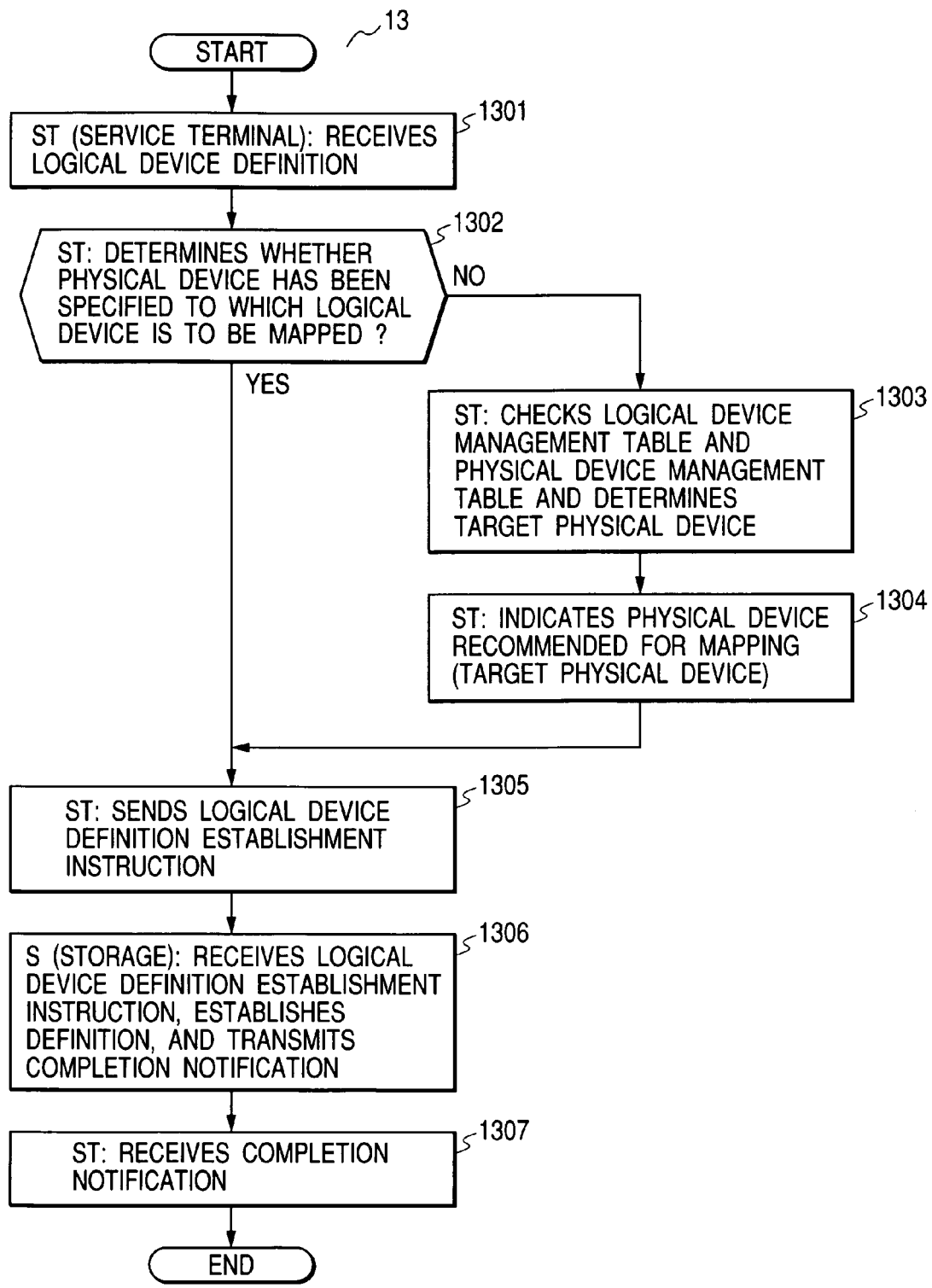
FIG. 14 is a process flowchart showing an illustrative example of logical device definition processing according to the present invention.

This system is configured such that the channel adapters 120, disk adapters 130, the cache memories 112, the shared memories 113, the power supplies 116, and the standby power supplies 117 are duplexed for failure handling. Each channel adapter 120 receives an input/output request from a host 100 through a port 121 and controls data transfer to/from the host 100. Each disk adapter 130 controls data transfer to/from a disk device 114. The channel adapters 120 and disk adapters 130 perform the data transfer via the cache memories 112. The power supplies 116 and the standby power supplies 117 supply power to the channel adapters 120, the disk adapters 130, the cache memories 112, the shared memories 113, and disk devices 114 through power lines 118. A cache memory 112 is a memory for temporarily storing write data received from a host 100 or data read from a disk device 114. To enhance the response to the hosts 100, a "write-back cache" method is generally used to handle a write request from each host 100. The "write-back cache" method issues a write completion notification to a host 100 at the time point at which data has been written into a cache memory 112. Each cache memory 112 is divided into equal portions referred to as segments. The state of each segment is managed by use of a segment management table 6 as described later. The shared memories 113 are shared by all channel adapters 120 and disk adapters 130. The shared memories 113 contain information for controlling data in each cache memory 112, information for controlling jobs run by the control processor in each channel adapter 120, and information for controlling jobs run by the control processor in each disk adapter 130. Specifically, as shown in FIG. 2, each shared memory 113 stores information such as a logical device management table 2, an LU path management table 3, a physical device management table 4, a slot management table 5, a segment management table 6, a channel job management table 7, a disk job management table 8, a host management table 9, an access pattern management table 10, a task management table 11, a scheduling management table 12, etc.

The service terminal 140 includes storage management program executing means 142 to 145 (PC, etc.) and input/output means 141 for the storage manager, and functions as the interface between the storage 110 and the storage manager so that the storage manager can use and manage the storage 110, such as setting the attributes of the logical devices, through I/F 146 and I/F 119.

As described above, the storage 110 includes: the ports 121 used as interfaces to the hosts 110; and control devices, that is, the channel adapters 120 and the disk adapters 130 for processing input/output requests exchanged between the hosts 100 and the storage 110. The control devices 120 and 130 are connected with the disk devices 114 through the connection lines 115 and further connected with the cache memories 112 and the shared memories 113 through the interconnection network 111. The storage 110 is connected with the service terminal 140 through the IF 119. The service terminal 140 receives various parameters (parameters for the logical device definition processing, the LU path definition processing, the logical device priority definition processing, the host priority definition processing, and the task priority measure definition processing shown in FIGS. 14 to 18, respectively) from the storage manager. The shared memories 113 included in the storage 110 store the various parameters received by the service terminal 140, as the management tables 2 to 11.

Description will be made below of an illustrative example of the logical device management table 2 with reference to FIG. 3. Each entry in the logical device management table 2 includes fields such as a logical device number 201, a size 202, a device state 203, a physical device number 204, an access-granted host number 205, a port number/target ID/LUN 206, a logical device priority 207, extended logical device information 208, and data save information in failure event 209.

The size field 202 contains the capacity of the logical device. For example, in FIG. 3, the size field 202 for the logical device number "1" and that for the logical device number "2" are set to 1 GB and 2 GB, respectively.

The device state field 203 contains information (a value) indicating the state of the logical device. The possible values are: "online", "offline", "not mounted", and "offline due to failure". The value "offline" indicates that the logical device has been defined and is properly operating, but cannot be accessed by the hosts 100 since no LU path has been defined, etc. The value "not mounted" indicates that the logical device has not yet been defined and therefore cannot be accessed by the hosts 100. The value "offline due to failure" indicates that the logical device has failed and therefore cannot be accessed by the hosts 100. A logical device set at "online" is set to "offline due to failure" when a failure has been detected in the logical device. For example, in FIG. 3, the device state 201 for the logical device number "1" and that for the logical device number "2" are set to "online".

The physical device number field 204 contains the physical device number of the physical device corresponding to the logical device. For example, in FIG. 3, the physical device number field 204 for the logical device number "1" and that for the logical device number "2" are set to 1 and 2, respectively.

The access-granted host number 205 is a host number for identifying the host 100 granted access to the logical device. For example, in FIG. 3, the access-granted host number field 205 for the logical device number "1" and that for the logical device number "2" are set to 1 and 2, respectively.

The port number/target ID/LUN field 206 contains information indicating which one of the plurality of ports 121 is currently connected to the logical device. A unique number within the storage 110 is assigned to each port 121, and this field stores the number of the port 121 with which an LUN definition is established for the logical device. The target ID and LUN in the field are identifiers used to identify the logical device. In this example, these identifiers are a SCSI-ID and LUN used by the hosts 100 to access a device on the SCSI (bus). For example, in FIG. 3, the port ID and the target ID/LUN for the logical device number "1" and those for the logical device number "2" are equally set to 1 and 0/0, respectively.

The logical device priority 207 is information indicating the priority of the data in the event of a failure in the storage 110. The possible values for this field are, for example, 1 to 5. For example, in FIG. 3, the logical device priority field for the logical device number "1" and that for the logical device number "2" are set to 1 and 5, respectively.

The extended logical device information 208 is information for combining a plurality of logical devices into a single logical device (referred to as an extended logical device) and providing it for the hosts 100. When an extended logical device is used, this field indicates a list of the numbers of the logical devices constituting the extended logical device. When, on the other hand, no extended logical device is used, the value "undefined" is set to the field. For example, in FIG. 3, the logical device with the logical device number "5" is made up of logical devices whose logical device numbers are 5 to 7; that is, a logical device having a size of 12 GB, which is equal to the sum of the sizes of the component logical devices, is provided for the hosts 100.

The "data save information in failure event" 209 is information used to check whether the dirty data held in the cache memories 112 and belonging to each logical device has been completely saved to disk devices 144 in the event of a failure. The possible values for this field are: "undefined", "not completed", and "completed". The value "undefined" indicates that no failure has occurred. The value "not completed" indicates that a failure has occurred but the destaging of the dirty data held in the cache memories 112 has not yet been completed. The value "completed", on the other hand, indicates that a failure has occurred and the destaging of the dirty data in the cache memories 112 has been completed. Normally, each "data save information in failure event" field 209 is set to "undefined", and when a failure has occurred, the "data save information in failure event" fields 209 for the logical devices holding dirty data in the cache memories 112 are set to "not completed".

Description will be made below of an illustrative example of the LU path management table 3 with reference to FIG. 4. Each entry in the LU path management table 3 includes fields such as a port number 301, a target ID/LUN 302, an access-granted host number 303, and an associated logical device number 304. This table holds valid LUN information for each port 121 within the storage 110. The target ID/LUN field 302 contains the address for the LUN defined for the port 121. The access-granted host number 303 is information indicating the host 100 granted access to the LUN of the port 121. When the LUNs of a plurality of ports 121 are defined for a logical device, the access-granted host number field 205 in the logical device management information 2 holds the host numbers of all the hosts granted access to these LUNs,. The associated logical device number field 304 contains the number of the logical device to which the LUN has been assigned. For example, in FIG. 4, the target ID field, the LUN field, the access-granted host number field, and the associated logical device number field for the port number "1" are set to 0, 0, 1, and 1, respectively.

Description will be made below of an illustrative example of the physical device management table 4 with reference to FIG. 5. Each entry in the physical device management table 4 includes fields such as a physical device number 401, a size 402, a corresponding logical device number list 403, a device state 404, a RAID configuration 405, a disk number list 406, a stripe size 407, a size within each disk 408, and a starting offset within each disk 409. The size field 402 contains the capacity of the physical device identified by the physical device number 401. The corresponding logical device number list filed 403 contains a list of the logical device numbers of the logical devices within the storage 110 corresponding to the physical device. When the physical device has been mapped to no logical device, this field is set to an invalid value. The device state field 404 contains information (a value) indicating the state of the physical device. The possible values are: "online", "offline", "not mounted", and "offline due to failure". The value "online" indicates that the physical device is properly operating and has been mapped to a logical device(s). The value "offline" indicates that the physical device has been defined and is properly operating, but has not yet been mapped to any logical device. The value "not mounted" indicates that the physical device has not yet been defined on a disk device 114. The value "offline due to failure" indicates that the physical device has failed and therefore has not been mapped to any logical device. It should be noted that for simplicity, the present embodiment assumes that each physical device is created on a disk device 114 at the time of shipping the product. Therefore, the initial value of the device state 404 of each usable physical device is set to "offline", while the initial value of the device state 404 of each of the other physical devices (unusable) is set to "not mounted". The RAID configuration field 405 holds information related to the RAID configuration such as the RAID level of each disk device 114 to which the physical device has been mapped, the number of data disks, and the number of parity disks. The stripe size field 407 holds the length of data units (stripes) into which data in the RAID (system) is divided. The disk number list field 406 holds the numbers of the plurality of disk devices 114 to which the physical device has been mapped and which constitute the RAID. Each number is unique within the storage 110 and used to identify a disk device 114. The "size within each disk" 408 and the "starting offset within each disk" 409 are information indicating the region of each disk device 114 in which the data belonging to the physical device is stored. For simplicity, the present embodiment assumes that all physical devices are mapped to the region of each disk device 114 having the same starting offset and the same size, the each disk device 114 constituting the RAID.

Description will be made below of an illustrative example of the slot management table 5 with reference to FIG. 6. Each host 100 uses a logical address to specify data on a logical device within the storage 110. A logical address is made up of, for example, a logical device number and information on a position within the logical device. In the storage 110, the continuous logical address space of the storage 110 is managed by dividing it into equal portions called slots. The size of the portions (slots) is referred to as the slot size. It is assumed that each slot number is obtained by dividing a logical address space by the slot size and adding 1. Each entry in the slot management table 5 includes fields such as a slot number 501, a segment number list 502, a slot attribute 503, a logical device number 504, a host number 505, and lock information 506. The segment number list field 502 holds a list of the segment numbers of the segments (equal portions of the cache memory) corresponding to the slot. For example, in FIG. 6, each slot includes four segments. If there is no segment at the position corresponding to a position-in the slot, the segment number list field 502 contains 0 (an invalid value) for that position. The slot attribute field 503 holds the attribute of the slot. The possible values are: "clean", "dirty", and "free". The value "clean" indicates that the data held in a cache memory 112 and belonging to the slot coincides with the corresponding data on a disk device 114. The value "dirty" indicates that the data held in the cache memory 112 and belonging to the slot has not yet been reflected in the disk device 114. The value "free" indicates that the slot is not currently used. The logical device number field 504 holds the logical device number corresponding to the slot. The host number field 505 holds the host number of the host 100 which has issued an input/output request for the slot. The lock information field 506 holds lock information used by the channel adapter 120 and the disk adapter 130 for the slot to operate exclusively of each other. The possible values are: "ON" and "OFF". The value "ON" indicates that the slot is locked, while "OFF" indicates that the slot is not locked.

Description will be made below of an illustrative example of the segment management table 6 with reference to FIG. 7. Each entry in the segment management table 6 includes fields such as a segment number 601 and block information 602. The block information 602 indicates whether the data held in each block of the segment is valid or invalid. A block is a unit used by the hosts 100 to access data. In the segment management table shown in FIG. 7, the segment size is 2048 bytes and the block size is 512 bytes. Each entry in the segment management table 6 includes 4 pieces of block information. In FIG. 7, the block information for the segment number "1" indicates that the block positions 1 and 3 are valid, that is, 512 bytes starting from the head of the segment and 512 bytes starting at the 1024-byte position store valid data.

Description will be made below of an illustrative example of the channel job management table 7 with reference to FIG. 8. A channel job is a job executed on a channel adapter 120. Each entry in the channel job management table 7 includes fields such as a job number 701, a processing type 702, a logical device number 703, a transfer start position 704, a transfer length 705, and a host number 706. The processing type field 702 contains the processing type of the job. The possible values for the processing type field 702 are "read" and "write". The logical device number field 703 holds the number of the logical device to be subjected to the processing performed by the job. The transfer start position field 704 holds an address in the logical device to be subjected to the processing by the job. The transfer length field 705 holds an access length used for the processing by the job. The host number field 706 holds the host number of the host 100 targeted for the processing by the job.

Description will be made below of an illustrative example of the disk job management table 8 with reference to FIG. 9. A disk job is a job executed on a disk adapter 130. An each entry in the disk job management table 8 includes fields such as a job number 801, a processing type 802, a logical device number 803, a transfer start position 804, a transfer length 805, a host number 806, and a channel adapter number 807. Description of the fields corresponding to those in FIG. 8 will be omitted. The channel adapter number field 807 holds the channel adapter number of the channel adapter corresponding to the requester of the job.

Description will be made below of an illustrative example of the host management table 9 with reference to FIG. 10. Each entry in the host management table 9 includes fields such as a host number 901, a host name/WWN 902, and a host priority 903. The host name/WWN 902 is information for uniquely identifying the host. The host priority 903 reflects the importance of the input/output processing performed for the host 100 and is used when jobs on the channel adapters and the disk adapters are scheduled. A job with a high priority means, for example, a job requiring a high-speed response, such as online transaction processing requiring an uninterrupted operation, while a job with a low priority means, for example, a job which does not require a high-speed response, such as batch processing during the night.

Description will be made below of an illustrative example of the access pattern management table 10 with reference to FIG. 11. Each entry in the access pattern management table 10 includes fields such as a logical device number 1001, a read count 1002, a write count 1003, a read hit count 1004, a write hit count 1005, a sequential read count 1006, and a sequential write count 1007. The read count 1002 indicates the number of read operations performed on the logical device. The write count 1003 indicates the number of write operations performed on the logical device. The read hit count 1004 indicates the number of read hits obtained on the logical device. The write hit count 1005 indicates the number of write hits obtained on the logical device. The sequential read count 1006 indicates the number of sequential read operations performed on the logical device. The sequential write count 1007 indicates the number of sequential write operations performed on the logical device. The dirty data amount management information field 1008 holds information indicating the amount of dirty data in the cache memories for each logical device, for example, an average amount of dirty data observed for the past 24 hours and that for the past year and the current value.

Description will be made below of an illustrative example of the task management table 11 with reference to FIG. 12. According to the present embodiment, a task is defined as a combination of a host and a logical device, even though a task of this definition may be different from those of conventional definitions in terms of scales. Each entry in the task management table 11 includes fields such as a task number 1101, a logical device number 1102, a host number 1103, and a task priority 1104. The logical device number 1102 and the host number 1103 indicate a logical device and a host, respectively, forming a task combination. The task priority 1104 is information indicating the priority of the data in the event of a failure in the storage 110. For example, the possible values for the task priority field 1104 are 1 to 5. For example, in FIG. 12, the logical device number field, the host number field, and the task priority field for the task number "1" are set to 0, 0, and 1, respectively. Job scheduling on the channel and the disk adapters is carried out based on the task priority. The meaning of the priority of a job was described in connection with the host management table 9.

Description will be made below of an illustrative example of the scheduling management table 12 with reference to FIG. 13. The scheduling management table 12 is used to manage scheduling parameters for job scheduling in the event of a failure; that is, set values for the logical device priority measure field 1201, the host priority measure field 1202, and the task priority measure field 1203 (setting the priority of each priority type in percentages) for scheduling. These values are used for job scheduling processing (shown in FIGS. 20 and 23) by the channel adapters, as described later. For example, in FIG. 13, the logical device priority measure field, the host priority measure field, the task priority measure field are set to 0.5, 0.3, and 0.2, respectively; that is, the logical device priority is used 5 times out of 10 in the job scheduling processing.

With reference to FIGS. 14 to 18, description will be made below of logical device definition processing 13, LU path definition processing 14, logical device priority definition processing 15, host priority definition processing 16, and task priority definition processing 17 all carried out by the storage manager using the service terminal ST (140). First of all, the storage manager performs the logical device definition processing 13 and the LU path definition processing 14 by use of the service terminal ST (140) so that a host 100 can access a logical device within the storage S (110). The storage manager then performs the logical device priority definition processing 15, the host priority definition processing 16, and the task priority definition processing 17 by use of the service terminal S (140) so that the storage S (110) can perform appropriate operation based on each set priority (the logical device priority, the host priority, and the task priority) when a failure has occurred. In the following figures, ST denotes the service terminal 140, and S denotes the storage 110.

First, description will be made of an illustrative example of the logical device definition processing using the service terminal 140. In the logical device definition processing 13, the storage 110 defines a logical device against a disk device 114 (or maps the logical device to the disk device) included in the storage 110 according to an instruction sent by the storage manager through the service terminal 140. First of all, the CPU 145 of the service terminal 140 receives a logical device definition (a logical device number, a physical device number, etc.) entered by the storage manager by use of the input device 141, the display 142, etc., and stores it in the memory 142 at step 1301. Then, at step 1302, the CPU 145 of the service terminal 140 determines whether the storage manager has indicated, in the logical device definition, the physical device number of the physical device to which the logical device is to be mapped. If the physical device number has been specified for some special reason, the CPU 145 of the service terminal 140 sends a logical device definition establishment instruction with the received logical device definition to the storage 110 through the I/Fs 146 and 119 at step 1305. At step 1306, upon receiving the instruction from the service terminal 140, the storage 110 sets a logical device number, a size, a device state, a physical device number, a starting address, and a logical device priority in the logical device management table 2 shown in FIG. 3. The logical device priority 207 is set to a default value, e.g., 3. After that, the storage 110 transmits a completion notification to the service terminal 140. The device state is set to the initial value "offline". Lastly, the service terminal 140 receives the completion notification from the storage 110 at step 1307.

If, on the other hand, the physical device number of the physical device to which the logical device is to be mapped has not been indicated, at step 1303 the CPU 145 of the service terminal 140 copies to the memory 143 the logical device management table 2 shown in FIG. 3 and the physical device management table 4 shown in FIG. 5 stored in the shared memories 113 and checks the copied information (tables) to determine the physical device to which the logical device is to be mapped. The determination is notified to the storage 110 and reflected in the logical device management table 2 and the physical device management table 4 within the shared memories 113. Specifically, the physical device to which each logical device is to be mapped is determined such that the data held in the cache memories 112 and belonging to logical devices with a high priority can be quickly saved to the disk devices 114. After that, this determination is notified to the storage 110 and reflected in the logical device management table 2 and the physical device management table 4, as described above. One mapping method (determination method) is to map a plurality of logical devices with the same priority to different physical devices (these physical devices together may be mapped to a single disk device 114 or a plurality of disk devices 114). Thus distributing each logical device to a different physical device prevents occurrence of access contention to the physical devices, which will lead to saving data at high speed. Further, another mapping method is to define an extended logical device made up of a plurality of logical devices and use it as a single logical device. This arrangement, in effect, distributes the logical devices to different physical devices, also making it possible to prevent occurrence of access contention to the physical devices, which will lead to saving data at high speed. Then, the service terminal 140 indicates to the storage manager the most suitable (recommended) physical device for mapping by use of its display 142 at step 1304. Then, the processing proceeds to step 1305 and subsequent steps described above.

That is, the logical device definition processing 13 is summarized as follows. The service terminal 140 receives the priority (the first priority) of each logical device to be provided for a host and maps these logical devices to different physical devices (which are together mapped to a single disk device or a plurality of disk devices) based on the priority of each logical device such that logical devices with a high first priority are mapped to more physical devices than those with a low first priority. The mapping arrangement is notified to the storage 110 and reflected in the logical device management table 2 and the physical device management table 4 within the shared memories 113. Therefore, by performing the logical device definition processing 13 beforehand, the control devices 130 in the storage 110 can quickly save important dirty data to disk devices when a failure has occurred (dirty data is data which has been written from the hosts 100 to the cache memories 112 and which has not yet been reflected in the disk devices).

Description will be made below of an illustrative example of the LU path definition processing using the service terminal 140 with reference to FIG. 15. In the LU path definition processing 14, the storage 110 sets a logical device it will provide according to an instruction sent by the storage manager through the service terminal 140 such that the logical device can be accessed by a host 100. First of all, the CPU 145 of the service terminal 140 receives an LU path definition establishment instruction through the input device 141, etc. and transfers it to the storage 110 at step 1401. The instruction includes a port number, an LUN, an access-granted host number, and a target logical device for LU definition. The storage 110 sets a value for each field in the LU path management table 3 shown in FIG. 4 and transmits a completion notification to the service terminal 140 at step 1402. Lastly, the service terminal 140 receives the completion notification from the storage 110 at step 1403.

Description will be made below of an illustrative example of the logical device priority definition processing using the service terminal 140 with reference to FIG. 16. The logical device priority definition processing 15 defines the order in which each piece of dirty data in the cache memories 112 is saved to the disk devices 114 when a failure has occurred. First of all, at step 1501, the CPU 145 of the service terminal 140 receives a logical device priority (establishment instruction) from the storage manager through the input device 141. Its input parameters include a logical device number and a logical device priority. Then, the service terminal 140 transmits the input parameters to the storage 110. At step 1502, upon receiving the input parameters from the service terminal 140, the storage 110 sets a logical device number and a logical device priority in the logical device management table 2 shown in FIG. 3 based on the input parameters and then sends a registration completion notification to the service terminal 140. Receiving the registration completion notification from the storage 110, the service terminal 140 notifies the storage manager of the completion at step 1503. Therefore, when a failure has occurred, the control devices 130 in the storage 110 can destage each piece of dirty data in the cache memories 112 to the disk devices 114 in the order of the logical device priority set in the above logical device priority definition processing 15.

Description will be made below of an illustrative example of the host priority definition processing using the service terminal 140 with reference to FIG. 17. The host priority definition processing 16 defines (or sets) the processing priority of an input/output request from each host 100. First of all, at step 1601, the CPU 145 of the service terminal 140 receives a priority (order establishment instruction) for a host 100 from the storage manager through the input device 141. Its input parameters include a host number and a priority. Then, the service terminal 140 transmits the input parameters to the storage 110. At step 1602, upon receiving the input parameters from the service terminal 140, the storage 110 sets a host priority 903 in the host management table 9 shown in FIG. 10 based on the input parameters and then sends a registration completion notification to the service terminal 140. Receiving the registration completion notification from the storage 110, the service terminal 140 notifies the storage manager of the completion at step 1603.

Description will be made below of an illustrative example of the task priority definition processing using the service terminal 140 with reference to FIG. 18. First of all, at step 1701, the CPU 145 of the service terminal 140 receives a task priority, or a second priority, (establishment instruction) from the storage manager through the input device 1411. The task priority is used to prevent performance reduction of important tasks in the event of a failure. Its input parameters include a task number, a pair of logical device and host numbers, and a task priority. Then, the service terminal 140 transmits the input parameters to the storage 110. At step 1702, upon receiving the input parameters from the service terminal 140, the storage 110 sets a logical device number 1102, a host number 1103, and a task priority 1104 in the task management table 11 shown in FIG. 12 based on the input parameters and then sends a registration completion notification to the service terminal 140. Receiving the registration completion notification from the storage 110, the service terminal 140 notifies the storage manager of the completion at step 1703. When a failure has occurred, the storage 110 can schedule jobs therein based on task priorities (second priorities) thus given by the service terminal 140, making it possible to prevent performance reduction of important tasks. It should be noted that the host priority may be used instead of the task priority.

Figure 19:
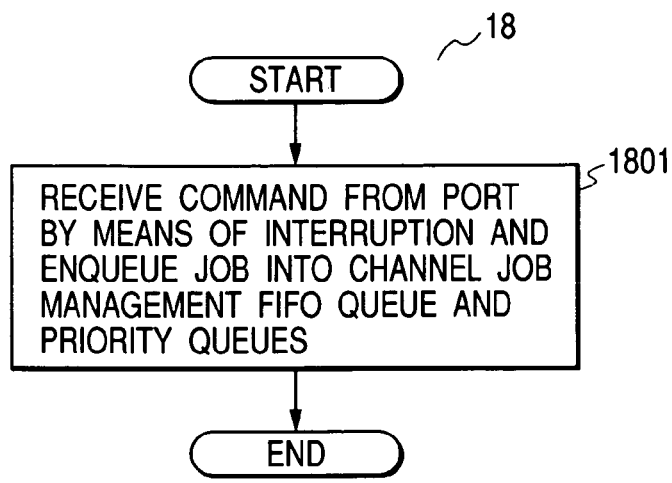
FIG. 19 is a process flowchart showing an illustrative example of channel adapter port processing performed by a channel adapter according to the present invention.

Description will be made below of an illustrative example of channel adapter port-processing performed by a channel adapter 120 with reference to FIG. 19. In the channel adapter port processing 18, the channel adapter 120 receives a command from a host 100 through a port 121 and registers a job in the channel job management table 7 shown in FIG. 8; specifically, according to the present embodiment, the channel adapter 120 enqueues the job into the FIFO queue, the logical device priority queue, the host priority queue, and the task priority queue (not shown) at step 1801. The priority queues are implemented by a known data structure such as an AVL-tree or B-tree. It should be noted that jobs are enqueued into the logical device priority queue, the host priority queue, and the task priority queue in the order of the logical device priority (the first priority) 207 (set by read/write commands from the hosts 100) in the logical device management table 2 shown in FIG. 3, the host priority 903 in the host management table 9 shown in FIG. 10, and the task priority (the second priority) 1104 in the task management table 11 shown in FIG. 12, respectively.

Figure 20:
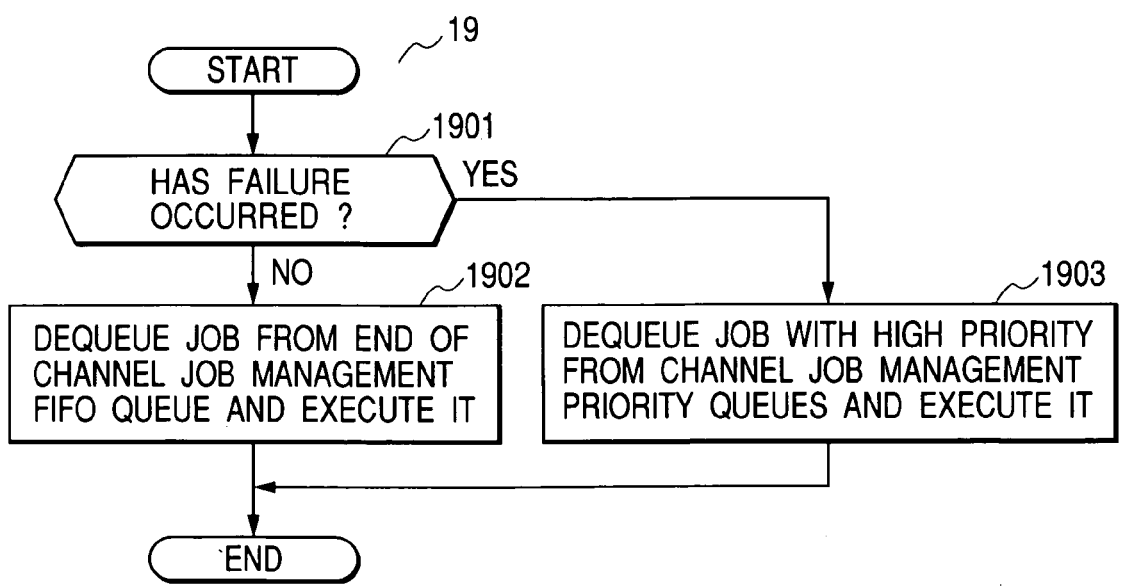
FIG. 20 is a process flowchart showing an illustrative example of job scheduling processing performed by a channel adapter according to the present invention.

Description will be made below of an illustrative example of job scheduling processing performed by a channel adapter 120, which is a control device of the present invention, with reference to FIG. 20. The job scheduling processing 19 is performed by the channel adapter 120, as follows. First of all, the channel adapter 120 determines at step 1901 whether a failure has occurred. If no, the channel adapter 120 dequeues the job at the end of the FIFO queue (not shown) and executes it at step 1902. The FIFO queue holds the jobs registered with the channel job management table 7. This job is also dequeued from the logical device priority queue, the host priority queue, and the task priority queue (not shown). If yes, the channel adapter 120 dequeues the job with the highest priority from a priority queue selected from among the logical device priority queue, the host priority queue, and the task priority queue (not shown) and executes it at step 1903. The selection of the priority queue is made based on the logical device priority measure 1201, the host priority measure 1202, and the task priority measure 1203 (the priority measure of each priority type set by the service terminal 140 in percentages) in the scheduling management table 12 shown in FIG. 13. It should be noted that at that time, the job is also dequeued from the FIFO queue (not shown). It should be further noted that if the job scheduling is always performed by use of only the priority queues, jobs with a low priority may not be executed for a long period of time since only jobs with a high priority may be executed. Therefore, it may be arranged that the FIFO queue is used instead of the priority queues at a certain rate. Each job executed in the job scheduling processing 19 by the channel adapter 120 described above corresponds to the read job processing 20 shown in FIG. 21 or the write job processing 21 shown in FIG. 22.

Figure 21:
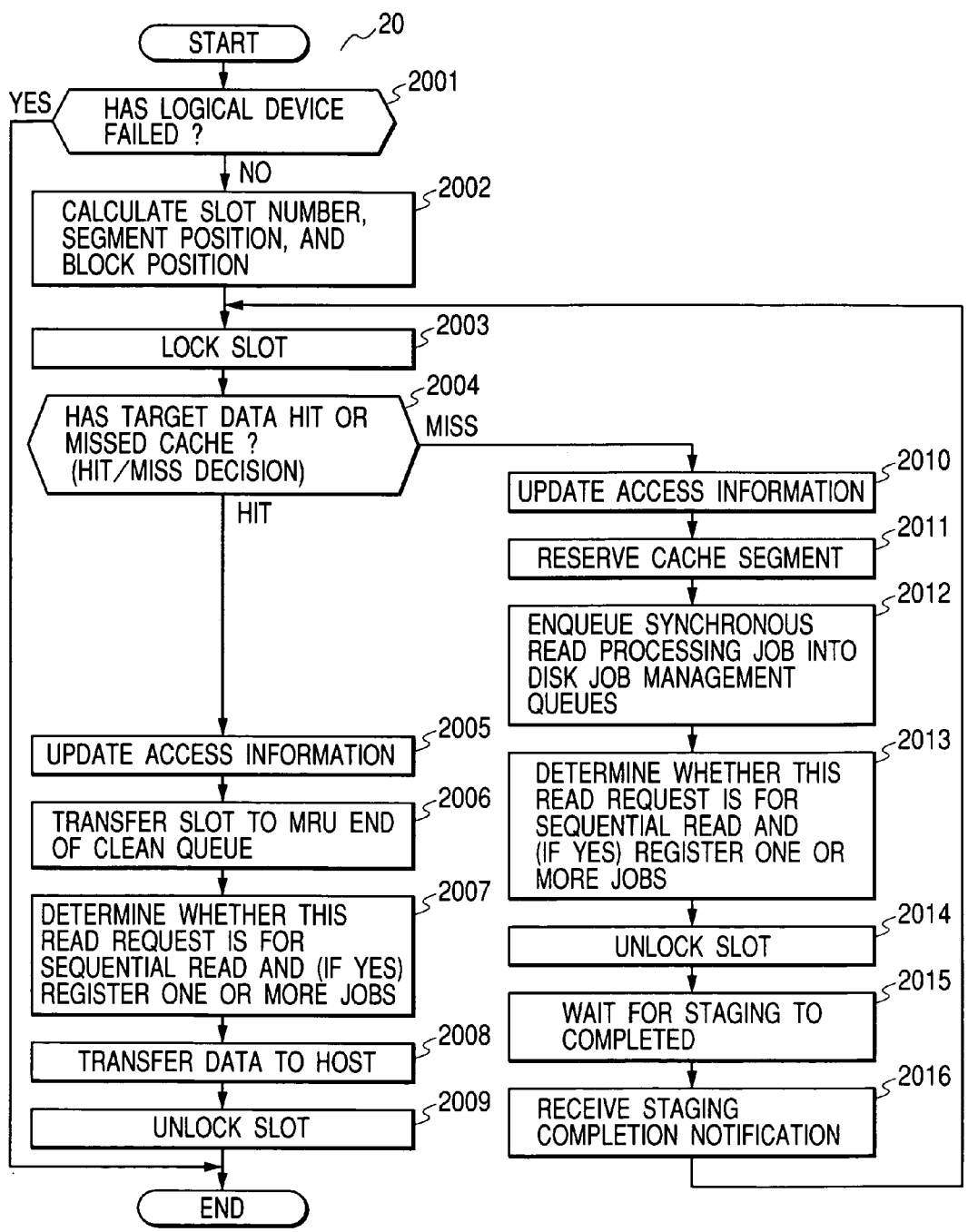
FIG. 21 is a process flowchart showing an illustrative example of read job processing performed by a channel adapter according to the present invention.

Description will be made below of an illustrative example of read job processing performed by a channel adapter 120 with reference to FIG. 21. In the read job processing 20, if the cache memories 112 hold the read data requested by a host 100, the channel adapter 120 transfers the data to the host 100. If, on the other hand, the cache memories 112 do not hold the requested read data, the channel adapter 120 requests the disk adapter 130 to stage it. Specifically, first the channel adapter 120 checks the device state of the logical device targeted for the read request at step 2001. If the device state is other than "online", the channel adapter 120 transmits an error (signal) to the host 100 and ends the processing. If there is no error (that is, the device state is set at "online"), then at step 2002 the channel adapter 120 analyzes the request made in the job scheduling processing 19 and calculates the slot number, the segment position, and the block position of the read data. After that, the channel adapter 120 checks and updates the slot corresponding to the slot number. However, before performing these operations, the channel adapter 120 locks the slot at step 2003 so that the other channel adapter 120 and the disk adapters 130 cannot access it. Specifically, the channel adapter 120 sets "ON" for the lock information in the slot management table 5 shown in FIG. 6. It should be noted that the following descriptions will omit the explanation of this lock operation to avoid undue repetition. Then, the channel adapter 120 makes a hit/miss decision for the read data at step 2004. Specifically, in the slot management table 5, the channel adapter 120 checks the segment number list corresponding to the slot number and obtains the segment number corresponding to the target segment position. The channel adapter 120 then checks the block information corresponding to the segment number and determines whether the data at the target block position is valid or invalid.

If it is determined that the data is valid (hit) at step 2004, the channel adapter 120 updates the access information at step 2005. Specifically, in the access pattern management table 10, the channel adapter 120 increments by one the read count and the read hit count of the logical device from which the read data is read, and furthermore determines whether this read request is for a sequential read based on the sequential-learning information (information on read access to sequential areas), not shown, stored in the shared memories 113. A sequential read means that a host 100 performs a series of read access operations to a continuous address space of the logical device. Detecting a sequential read, the channel adapter 120 reads, ahead of time, data subsequent to the last read data from the logical device asynchronously with respect to requests from the host 100. This arrangement increases the possibility of each read request hitting the caches in synchronous read processing, which will lead to high-speed read access. If the request is for a sequential read, then in the access pattern management table 10 the channel adapter 120 increments by one the sequential read count of the logical device from which the read data is read. At step 2006, the channel adapter 120 transfers the slot to the MRU end of the clean queue. Then, if it is determined based on the sequential-learning information that the read request is for a sequential read, the channel adapter 120 registers one or a plurality of jobs in the disk job management table 8 for look-ahead at step 2007. Specifically, the channel adapter 120 enqueues the job(s) into the FIFO queue, the logical device priority queue, the host priority queue, and the task priority queue in the same manner as that described with reference to FIG. 19. Lastly, the channel adapter 120 transfers the target data to the host 100 at step 2008 and unlocks the slot at step 2009. Specifically, the channel adapter 120 sets "OFF" for the lock information in the slot management table 5. It should be noted that the following descriptions will omit the explanation of this unlock operation to avoid undue repetition. This completes the description of the steps taken if the data has hit a cache.

If it is determined that the data is invalid (miss) at step 2004, the channel adapter 120 first updates the access information at step 2010. Specifically, in the access pattern table 10, the channel adapter 120 increments by one the read count of the logical device from which the read data is read. The sequential read count in the access pattern management table 10 is updated in the same manner as when the data has hit a cache. Then, the channel adapter 120 newly reserves the necessary number of cache segments at step 2011. The newly reserved cache segments may be those held in the queue for managing unused cache segments (the free queue, not shown), or those belonging to a slot which is queue-managed by use of a known technique such as the LRU algorithm and whose slot attribute is "clean". Then, the channel adapter 120 registers a job in the disk job management table 8 at step 2012. Specifically, the channel adapter 120 enqueues the job into the FIFO queue and the priority queues in the same manner as that described with reference to FIG. 19. The channel adapter 120 reads data ahead of time based on the sequential-learning information at step 2013. The specific steps are the same as those taken if the data has hit a cache. After that, the channel adapter 120 unlocks the slot at step 2014 and waits for a disk adapter 130 to complete the staging, at step 2015. After the channel adapter 120 receives a staging completion notification from the disk adapter 130 at step 2016, the processing returns to step 2003. The subsequent steps (the hit/miss decision, etc.) are the same as those taken if the data has hit a cache since the staging has already been completed.

Figure 22:
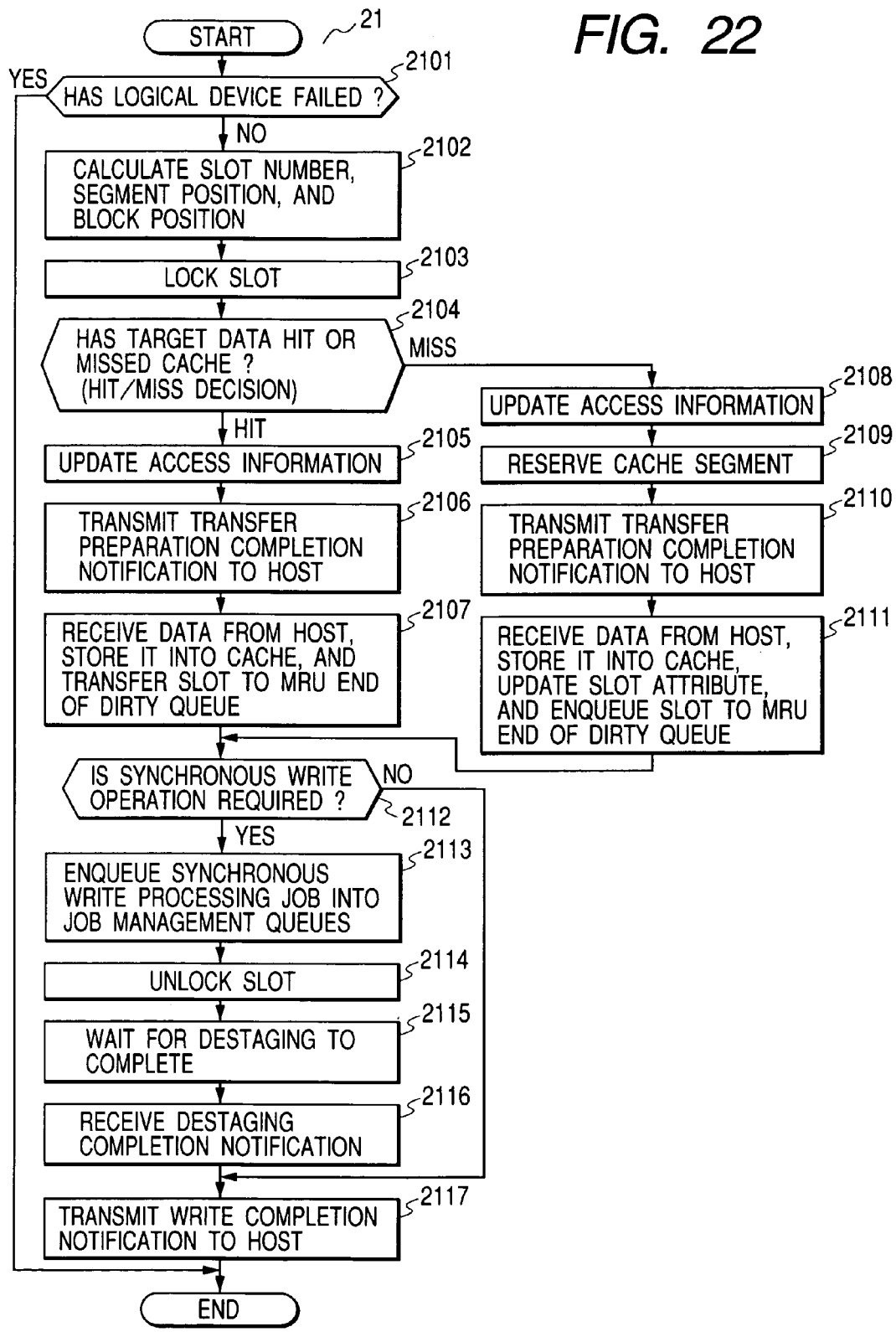
FIG. 22 is a process flowchart showing an illustrative example of write job processing performed by a channel adapter according to the present invention.

Description will be made below of an illustrative example of the write job processing performed by a channel adapter 120 with reference to FIG. 22. In the write job processing 21, the channel adapter 12 receives write data from a host 100 and stores it in a cache memory 112. The channel adapter 120 then requests a disk adapter 130 to destage the data when necessary. After that, the channel adapter 120 transmits a completion notification to the host 100. Specifically, first the channel adapter 120 checks the device state of the logical device targeted for the write request at step 2101. If the device state is other than "online", the channel adapter 120 transmits an error (signal) to the host 100 and ends the processing. If there is no error (that is, the device state is set at "online"), then at step 2102 the channel adapter 120 analyzes the request made in the job scheduling processing 19 and calculates the slot number, the segment position, the block position of the write data. After that, at step 2103, the channel adapter 120 locks the slot corresponding to the slot number for the reason described above with reference to FIG. 21. Then, at step 2104, the channel adapter 120 makes a hit/miss decision for the write data in the same manner as that described with reference to FIG. 21.

In the case of a cache hit, the channel adapter 120 updates the access information at step 2105. Specifically, in the access pattern management table 10, the channel adapter 120 increments by one the write count and the write hit count of the logical device to which the write data is written. Furthermore, the channel adapter 120 determines whether this write request is for a sequential write based on the sequential-learning information (not shown) stored in the shared memories 113. A sequential write means that a host 100 performs a series of write access operations to a continuous address space of the logical device. If the request is for a sequential write, then in the access pattern management table 10 the channel adapter 120 increments by one the sequential write count of the logical device to which the write data is written. Then, the channel adapter 120 transmits a transfer preparation completion message to the host 100 at step 2106. After that, the channel adapter 120 receives the write data from the host 100, stores it into a cache memory 112, and transfers the slot to the MRU end of the dirty queue at step 2107.

In the case of a cache miss, the channel adapter 120 first updates the access information at step 2108. Specifically, in the access pattern management table 10, the channel adapter 120 increments by one the write count of the logical device to which the data is written. The sequential write count in the access pattern management table 10 is updated in the same manner as when the data has hit a cache. Then, the channel adapter 120 newly reserves the necessary number of cache segments at step 2109 and transmits a transfer preparation completion message to the host 100 at step 2110. After that, the channel adapter 120 receives the write data from the host 100, stores it into a cache memory 112, and enqueues the slot to the MRU end of the dirty queue at step 2111.

The subsequent steps vary depending on whether a synchronous write operation is required. The channel adapter 120 determines whether such an operation is required at step 2112. The failure occurrence flag in the shared memories 113 (described later) is set to "ON" to indicate that a synchronous write operation is required, and set to "OFF" to indicate otherwise. If no, the channel adapter 120 transmits a write completion notification to the host 100 at step 2117. If yes, the channel adapter 120 registers a job in the disk job management table 8 at step 2113. Specifically, the channel adapter 120 enqueues the job into the FIFO queue and the priority queues in the same manner as that described with reference to FIG. 19. After that, the channel adapter 120 unlocks the slot at step 2114 and waits for a disk adapter to complete the destaging at step 2115. Then, the channel adapter 120 receives a destaging completion notification from the disk adapter 130 at step 2116 and then transmits a completion notification to the host 100 at step 2117. The synchronous write operation ensures that the data is written to a disk drive 114.

This completes the description of the job scheduling processing 19 performed by the channel adapter 120.

Figure 23:
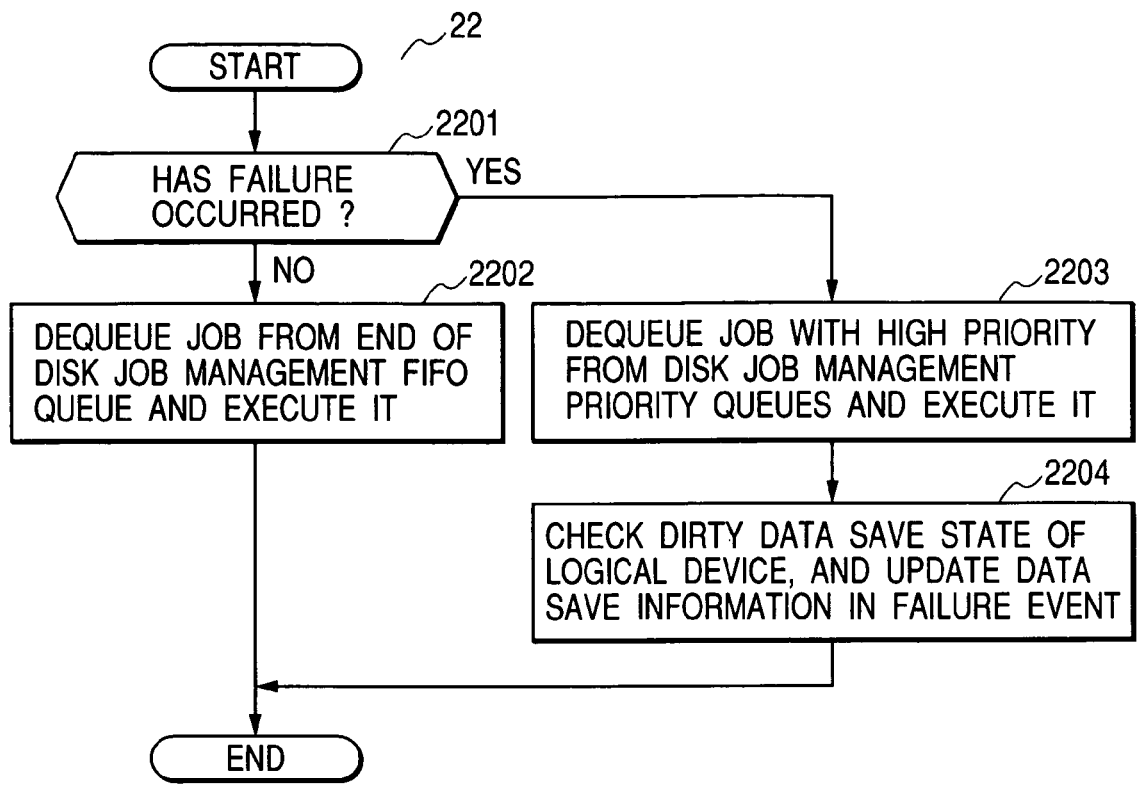
FIG. 23 is a processing flowchart showing an illustrative example of job scheduling processing performed by a disk adapter according to the present invention.

Description will be made below of an illustrative example of job scheduling processing performed by a disk adapter 130, which is a control device of the present invention, with reference to FIG. 23. The job scheduling processing (22) performed by the disk adapters 130 is different from that described with reference to FIG. 20 in that this processing uses the disk job management table 8 instead of the channel job management table 7 and includes a step for processing dirty data in the event of a failure, as described later. The other components and steps are the same as those described with reference to FIG. 20. Specifically, first of all, the disk adapter 130 determines at step 2201 whether a failure has occurred. If no, the disk adapter 130 dequeues the job at the end of the FIFO queue (not shown) which holds the jobs registered with the disk job management table 8 shown in FIG. 9, and executes it at step 2202. If yes, the disk adapter 130 dequeues the job with the highest priority from a priority queue selected from among the logical device priority queue, the host priority queue, and the task priority queue (not shown) which hold jobs registered with the disk job management table 8 shown in FIG. 9, and executes it at step 2203. At step 2204 (taken when a failure has occurred), the disk adapter 130 searches the logical device management table 2 for logical devices whose "data save information in failure event" 209 is set to "not completed", which indicates that the dirty data held in the cache memories 112 and belonging to these logical devices has not been completely saved to disk devices 114. In the access pattern management table 10, the disk adapter 130 checks the current value of the dirty data amount in the dirty data amount management information 1008 on each of such logical devices, and if it is set at 0, sets "completed" for the data save information in failure event 209. Each job executed in the job scheduling processing 22 by the disk adapter 130 described above corresponds to the read job processing 24 shown in FIG. 25 or the write job processing 25 shown in FIG. 26.

Figure 24:
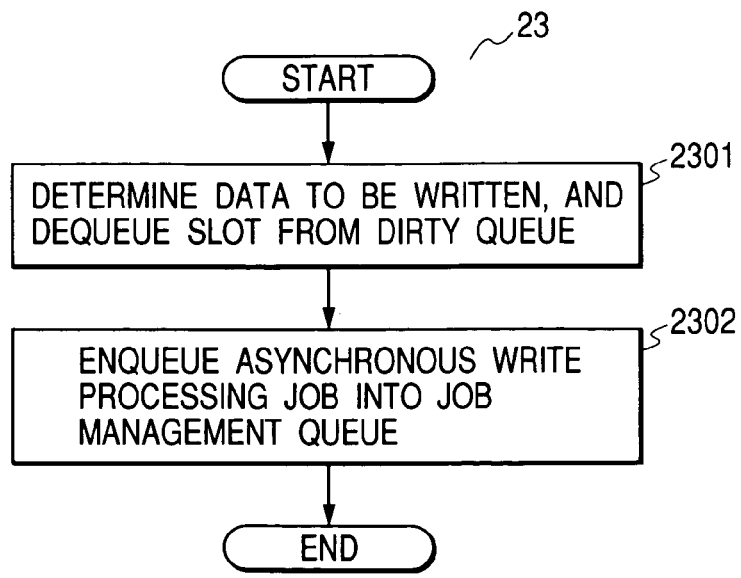
FIG. 24 is a process flowchart showing an illustrative example of asynchronous write job registration processing according to the present invention.

Description will be made below of an illustrative example of asynchronous write job registration processing performed by a disk adapter 130 with reference to FIG. 24. In the asynchronous write job registration processing 23, the disk adapter 130 writes write data held in a cache memory 112 into a physical device. First of all, the disk adapter 130 dequeues the target slot from the LRU end of the dirty queue at step 2301. Then, the disk adapter 130 registers a job in the disk job management table 8 at step 2302. Specifically, the disk adapter 130 enqueues the job into the FIFO queue and the priority queues in the same manner as that described with reference to FIG. 19.

Figure 25:
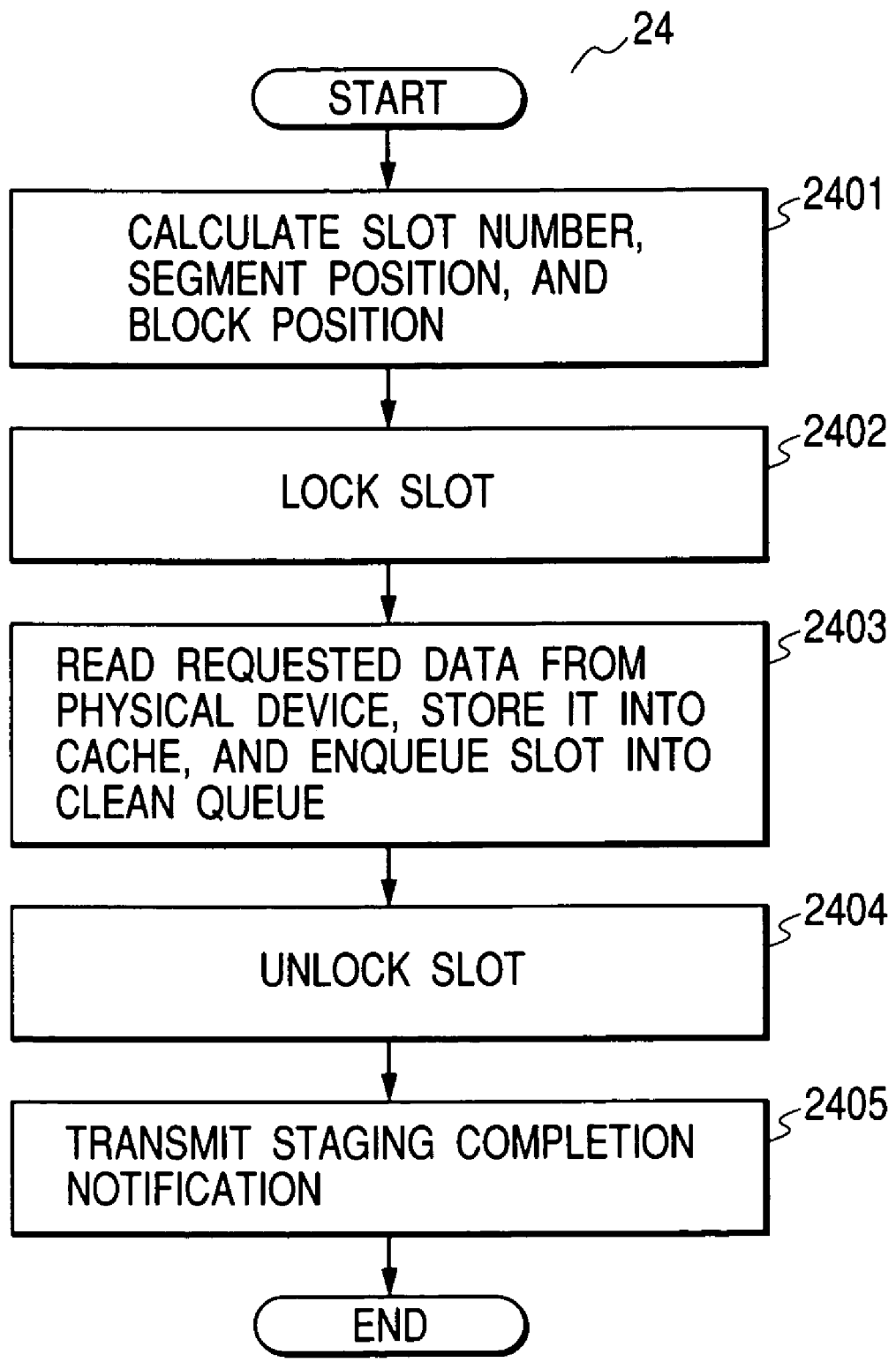
FIG. 25 is a process flowchart showing an illustrative example of read job processing performed by a disk adapter according to the present invention.

Description will be made below of an illustrative example of read job processing performed by a disk adapter 130 with reference to FIG. 25. The read job processing 24 is performed by the disk adapter 130, as follows. First of all, the disk adapter 130 analyzes a request made in the job scheduling processing 22 and calculates the slot number, the segment position, and the block position of the read data at step 2401. After that, the disk adapter 130 checks and updates the slot corresponding to the slot number. However, before performing these operations, the disk adapter 130 locks the slot at step 2402 so that the other disk adapter 130 and the channel adapters 120 cannot access it. Then, the disk adapter 130 reads the data from a physical device, stores it into a cache memory 112, and enqueues the slot to the MRU end of the clean queue at step 2403 before unlocking the slot at step 2404. After that, at step 2405 the disk adapter 130 transmits a staging completion notification to the channel adapter 120 for the channel job identified by the channel job number 807 in the disk job management table 8.

Figure 26:
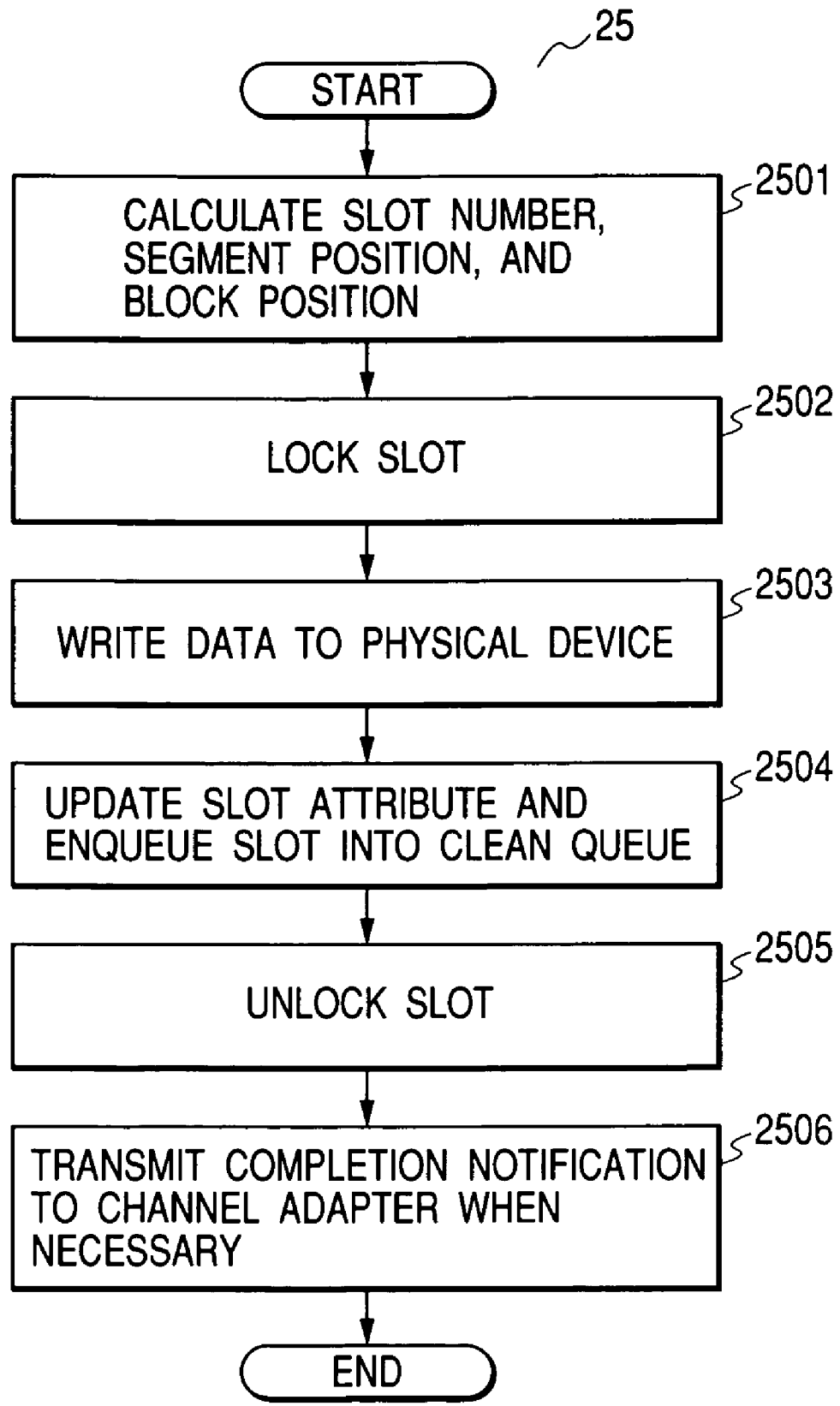
FIG. 26 is a process flowchart showing an illustrative example of write job processing performed by a disk adapter according to the present invention.

Description will be made below of an illustrative example of write job processing performed by a disk adapter 130 with reference to FIG. 26. The write job processing 25 by the disk adapter 130 will be described as follows. First of all, the disk adapter 130 analyzes a request made in the job scheduling processing 22 and calculates the slot number, the segment position, and the block position of the write data at step 2501. The disk adapter 130 locks the slot at step 2502 and writes the dirty data belonging to the slot into a physical device at step 2503. After that, the disk adapter 130 updates the slot attribute of the slot to "clean" and enqueues it into the clean queue at step 2504. Lastly, the disk adapter 130 unlocks the slot at step 2505, and if this write job is for a synchronous write, then at step 2506 the disk adapter 130 transmits a destaging completion notification to the channel adapter 120 for the channel job identified by the channel job number 807 in the disk job management table 8.

This completes the description of the job scheduling processing 22 performed by the disk adapter 130.

Description will be made below of an illustrative example of failure handling processing according to the present invention with reference to FIG. 27. In the failure handling processing 26, the control devices 120 and 130 save to the physical devices the dirty data held in the cache memories 112 and belonging to each logical device. First of all, a disk adapter 130 determine at step 2601 whether this failure handling processing should be ended. Specifically, for example, the disk adapter 130 ends the processing if it is necessary to stop the operation of the storage 110. If no, then at step 2602 the disk adapter 130 checks each component within the storage 110 to see if a failure has occurred. At step 2603, the disk adapter 130 determines whether a failure has occurred. If the disk adapter 130 has detected the occurrence of a failure, then at step 2604 the disk adapter 130 sets the "data save information in failure event" 209, as well as setting "ON" for the failure occurrence flag (not shown) in the shared memories 113, as described above with reference to FIG. 3. It should be noted that the failure occurrence flag is normally set to "OFF". Then, a channel adapter 120 enqueues a dirty data write job for each logical device at step 2605. Specifically, in the access pattern management table 10, the channel adapter 130 checks the current value in the dirty data amount management information 1008 on each logical device, and if it is set to other than 0, scans the logical address space of the logical device to find a slot(s) whose slot attribute is set to "dirty". The channel adapter 120 then registers a write job for the slot(s) in the disk job management table 8. Specifically, the channel adapter 120 enqueues the job into the FIFO queue and the priority queues in the same manner as that described above with reference to FIG. 19. If the disk adapter 130 has not detected the occurrence of a failure at step 2603, the processing returns to step 2601. After step 2605, the channel adapter 120 waits for the target write job to complete at step 2606. During that time, if at step 2606 the disk adapter 130 has detected power shortage of a standby power supply or a double cache memory failure of the target data, then at step 2607 the channel adapter 120 sets the device state of the target logical device to "offline due to failure" since the data belonging to the logical device is regarded as being lost. If the entire write operation has been completed at step 2606, the processing returns to step 2601.

As explained above, each processing of the channel adapter port processing 18, the job scheduling processing 19, the job scheduling processing 22 and the failure handling processing etc. based on the logical device definition processing 13, the LU path definition processing 14, the logical device priority definition processing 15, the host priority definition processing 16 and the task priority definition processing 17 etc. using the service terminal 140, is performed when the control devices 120 and 130 in the storage 110 perform a control program. Furthermore, the control program for performing each processing is stored in the shared memory 113 of the storage 110.

Figure 27:
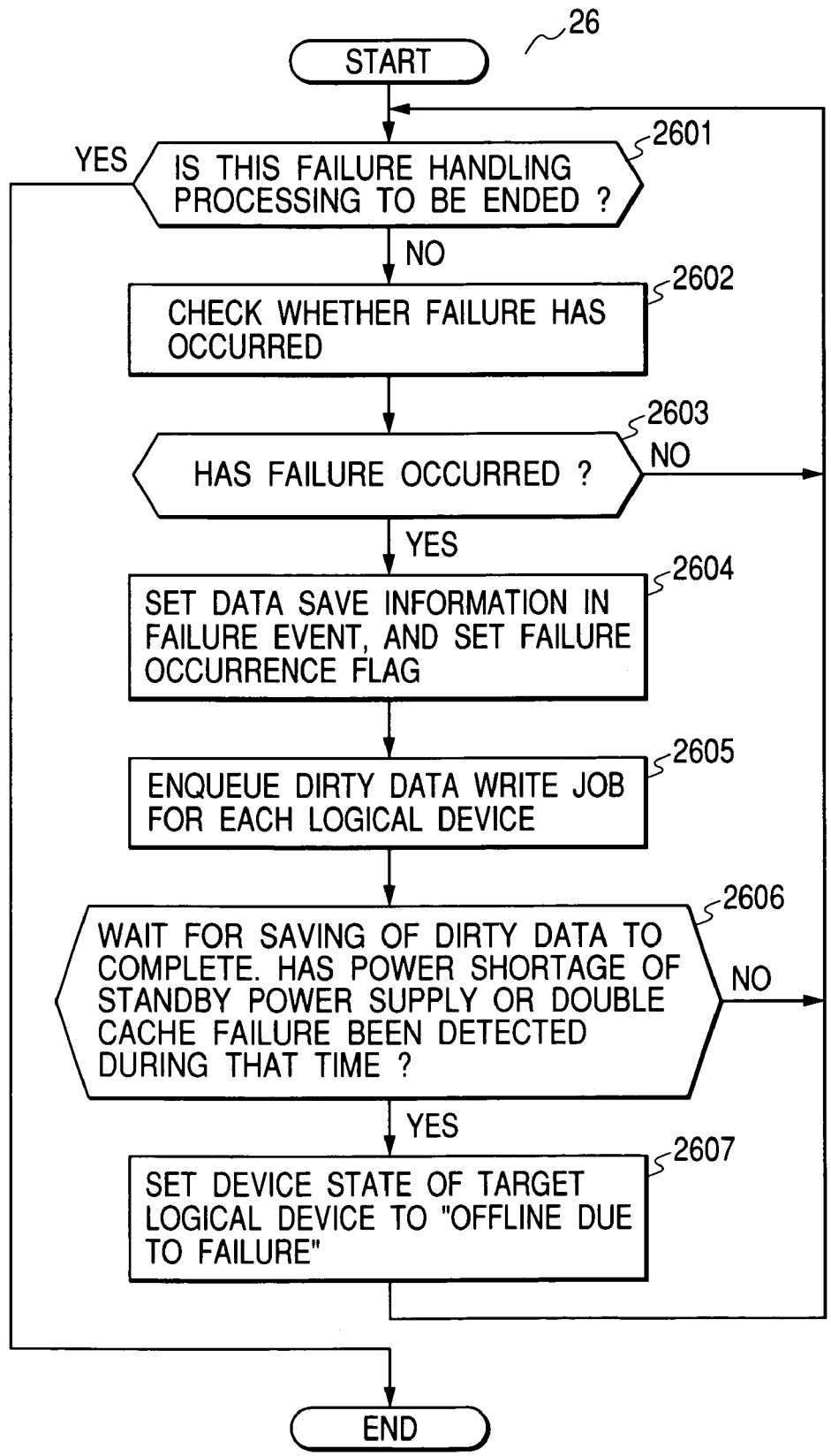
FIG. 27 is a process flowchart showing an illustrative example of failure handling processing according to the present invention.

According to another embodiment of the present invention, after a failure has occurred in the storage 110, if the saving of write data has not been completed in the failure handling processing 26 shown in FIG. 27 or a double cache failure has occurred (and therefore the dirty data in the cache memories 112 is regarded as being lost), the slot position of the data is indicated on the display 142 of the service terminal 140. The present embodiment, on the other hand, searches the logical device management table 2 for logical devices whose "data save information in failure event" is set to "not completed", calculates the slot position of the dirty data belonging to each of the logical devices by checking the slot management table 5, and displays the slot numbers and the logical device numbers on the display 142. With this arrangement, the storage manager can recover the lost data (area), resulting in reduced recovery time.

According to the present embodiment described above, in the event of a failure in the storage, the dirty data in the cache memories within the storage can be quickly saved to the disk devices, making it possible to prevent loss of important data with a high priority. Furthermore, in the event of a failure in the storage, it is possible to prevent performance reduction of important tasks with a high priority whenever possible.

What is claimed is:

1. A storage system comprising:
    a port functioning as an interface to a host;
    a cache memory;
    a shared memory;
    a control device connected to said port, said cache memory, and said shared memory through a connection line; and
    one or more disk devices connected to said control device, said disk devices comprising a plurality of physical devices, and whereby at least one logical device is provided for said host;
    wherein said storage system is coupled to a service terminal connected thereto for receiving first priority information on each logical device provided for said host;
    wherein said control device maps more physical devices to a logical device with a high priority than that with a low priority based on said first priority information received from said service terminal; and
    wherein in the event of a failure, said control device performs control such that data held in said cache memory and belonging to each logical device is saved to the physical devices mapped to each said logical device.

2. The storage system as claimed in claim 1, wherein said shared memory stores a mapping relationship between each logical device and the physical devices, said mapping relationship being established based on said first priority information.

3. The storage system as claimed in claim 1, wherein:
    said service terminal is adapted to receive second priority information indicating a task priority; and
    in the event of a failure, said control device performs control such that a job with a high priority is executed after it is dequeued from a priority queue within said storage system based on said second priority information received from said service terminal.

4. The storage system as claimed in claim 3, wherein said shared memory stores said second priority information received by said service terminal.

5. The storage system as claimed in claim 1, wherein if data is lost in the event of a failure, said storage system outputs information indicating a logical device and a position in said logical device corresponding to said lost data to said service terminal.

6. A method for controlling a storage system which includes:
    a port functioning as an interface to a host;
    a cache memory;
    a shared memory;
    a control device connected to said port, said cache memory, and said shared memory through a connection line; and
    one or more disk devices connected to said control device, said disk devices comprising a plurality of physical devices, and whereby at least one logical device is provided for said host;
    wherein said method comprises:
    a first step of receiving first priority information on each logical device provided for said host; and
    a second step of mapping more of said physical devices to a logical device with a high priority than that with a low priority based on said first priority information received at said first step, and in the event of a failure, saving data held in said cache memory and belonging to each logical device to the physical devices mapped to each said logical device.

7. The method as claimed in claim 6, further comprising:
    a third step of storing a mapping relationship between each logical device and a the physical devices into said shared memory, said mapping relationship being established based on said first priority information received at said first step.

8. The method as claimed in claim 6, further comprising:
    a fourth step of receiving second priority information indicating a task priority; and
    a fifth step of, in the event of a failure, performing control such that a job with a high priority is executed after it is dequeued from a priority queue within said storage system based on said second priority information received at said fourth step.

9. The method as claimed in claim 8, further comprising:
    a sixth step of storing said second priority information received at said fourth step, into said shared memory.

10. A method for controlling a storage system which includes:
    at least one port functioning as an interface to at least one host;
    at least one cache memory;
    at least one shared memory;
    at least one control device connected to said at least one port, said at least one cache memory, and said at least one shared memory through at least one connection line; and
    one or more disk devices connected to said at least one control device, said disk devices comprising a plurality of physical devices, and whereby at least one logical device is provided for the at least one host;
    wherein said method comprises:
    a first step of receiving first priority information on each logical device provided for said at least one host;
    a second step of mapping more of said physical devices to a logical device with a high priority than that with a low priority based on said first priority information received at said first step, and in the event of a failure, saving data held in said at least one cache memory and belonging to each said logical device to the physical devices mapped to each said logical device;

a third step of storing a mapping relationship between each logical device and the physical devices into said at least one shared memory, said mapping relationship being established based on said first priority information received at said first step;

a fourth step of receiving second priority information indicating a task priority; and a fifth step of, in the event of a failure, performing control such that a job with a high priority is executed after it is dequeued from a priority queue within said storage system based on said second priority information received at said fourth step.

11. The method as claimed in claim 10, further comprising:

a sixth step of storing said second priority information received at said fourth step, into said shared memory.

* * * * *